US008873475B2

(12) United States Patent
Ono

(10) Patent No.: US 8,873,475 B2
(45) Date of Patent: Oct. 28, 2014

(54) METHOD OF CONTROLLING ALLOCATION OF A RADIO RESOURCE FOR TRANSMITTING A RADIO RESOURCE ALLOCATION REQUEST

(75) Inventor: Yoshiyuki Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 778 days.

(21) Appl. No.: 12/612,893

(22) Filed: Nov. 5, 2009

(65) Prior Publication Data
US 2010/0135233 A1 Jun. 3, 2010

(30) Foreign Application Priority Data

Nov. 6, 2008 (JP) ................................ 2008-285779

(51) Int. Cl.
H04W 4/00 (2009.01)
H04W 72/12 (2009.01)
H04L 12/28 (2006.01)
H04J 3/00 (2006.01)
H04L 12/66 (2006.01)
H04W 72/00 (2009.01)
H04W 72/04 (2009.01)
H04W 8/24 (2009.01)

(52) U.S. Cl.
CPC ...... H04W 72/1252 (2013.01); H04W 72/1284 (2013.01); H04W 72/0413 (2013.01); H04W 72/042 (2013.01); H04W 8/24 (2013.01); H04W 72/1242 (2013.01)
USPC ........ 370/329; 370/395.4; 370/336; 370/352; 455/422.1; 455/450

(58) Field of Classification Search
USPC ............ 370/329, 395.4, 336, 352; 455/422.1, 455/450, 517
See application file for complete search history.

(56) References Cited

U.S. PATENT DOCUMENTS

2005/0259662 A1* 11/2005 Kim et al. .................. 370/395.4
(Continued)

FOREIGN PATENT DOCUMENTS

JP 2007-53747 A 3/2007
JP 2008-306383 A 12/2008
WO WO 2009/116939 9/2009

OTHER PUBLICATIONS

Partial European Search Report mailed Jul. 1, 2011 for corresponding European Application No. EP 09174523.2.
LG Electronics Inc., "BSR for Persistent Scheduling", 3GPP TSG-RAN WG2 #61, Feb. 11, 2008, Sorrento, Italy.
Nokia Corporation, et al., "Persistent scheduling for UL", 3GPP TSG-RAN WG2 Meeting #62, May 5, 2008, Kansas City, USA.

(Continued)

Primary Examiner — Christopher M Brandt
Assistant Examiner — Muthuswamy Manoharan
(74) Attorney, Agent, or Firm — Fujitsu Patent Center

(57) ABSTRACT

Provided is a allocation controlling method of a radio resource for a radio resource allocation request in a base station which allocates, to a terminal, in response to the radio resource allocation request received from the terminal, a radio resource for transmitting retention data in a transmission buffer of the terminal to the base station, and which transmits to the terminal a radio resource allocation notification indicating a result of the allocation. When an amount of retention data in the transmission buffer received from the terminal is not zero, a transmission cycle that is suited to the retention amount is determined as a transmission cycle of the notification of radio resource allocation for transmitting the retention data in the transmission buffer and, during cyclic transmission of the radio resource allocation notification, the allocation of a radio resource for the radio resource allocation request is stopped.

5 Claims, 25 Drawing Sheets

(56) References Cited

U.S. PATENT DOCUMENTS

2007/0047452 A1    3/2007  Lohr et al.
2008/0008152 A1    1/2008  Lohr et al.
2010/0040028 A1*   2/2010  Maheshwari et al. ........ 370/336
2010/0142457 A1*   6/2010  Chun et al. .................... 370/329

OTHER PUBLICATIONS

NTT DoCoMo Inc., "Issues regarding UL Persistent scheduling", 3GPP TSG-RAN WG2 Meeting #60bis, Jan. 14, 2008, Sevilla, Spain.
Japanese Office Action mailed Nov. 20, 2012 for corresponding Japanese Application No. 2008-285779, with English-language Translation.

* cited by examiner

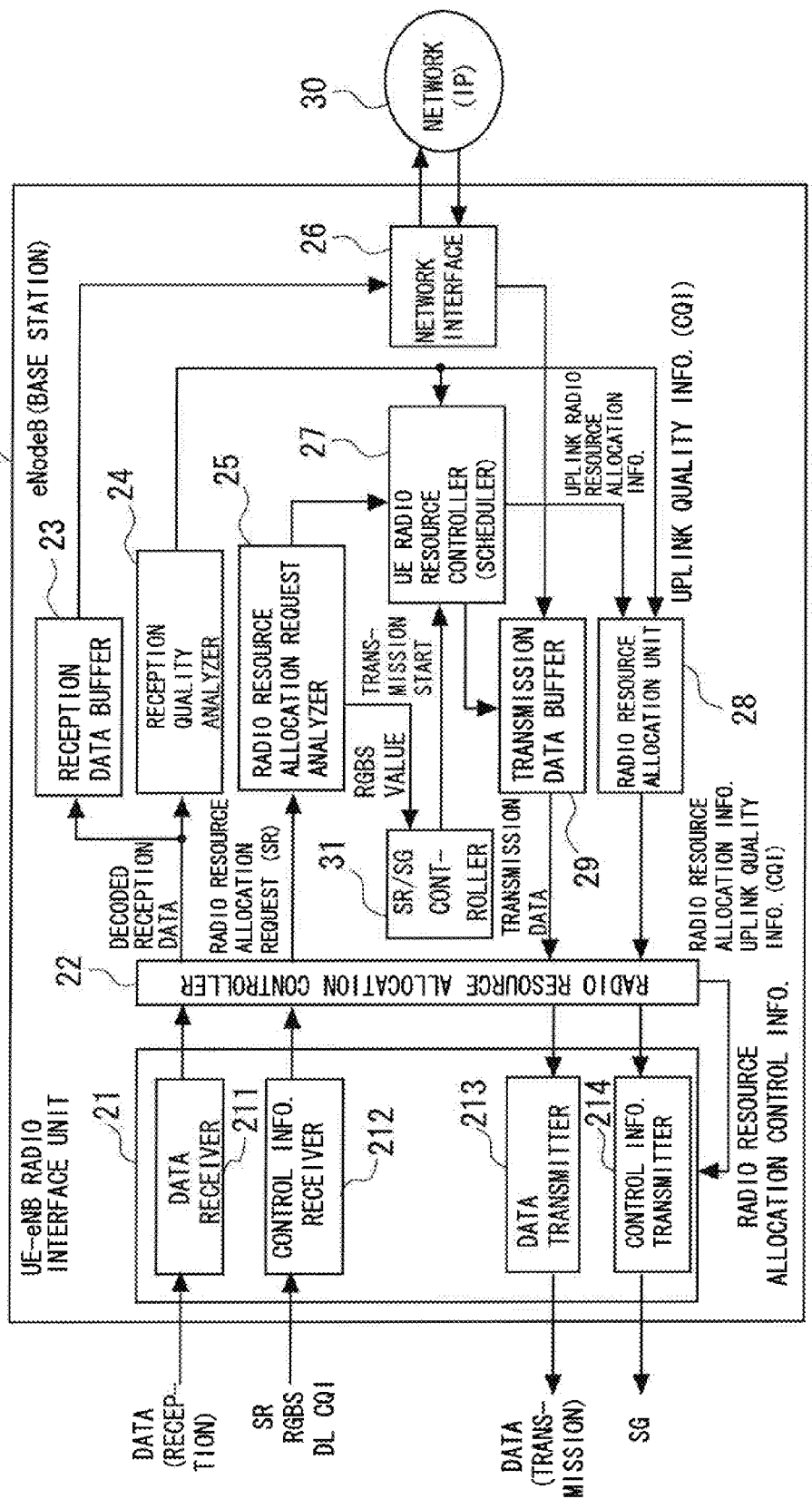

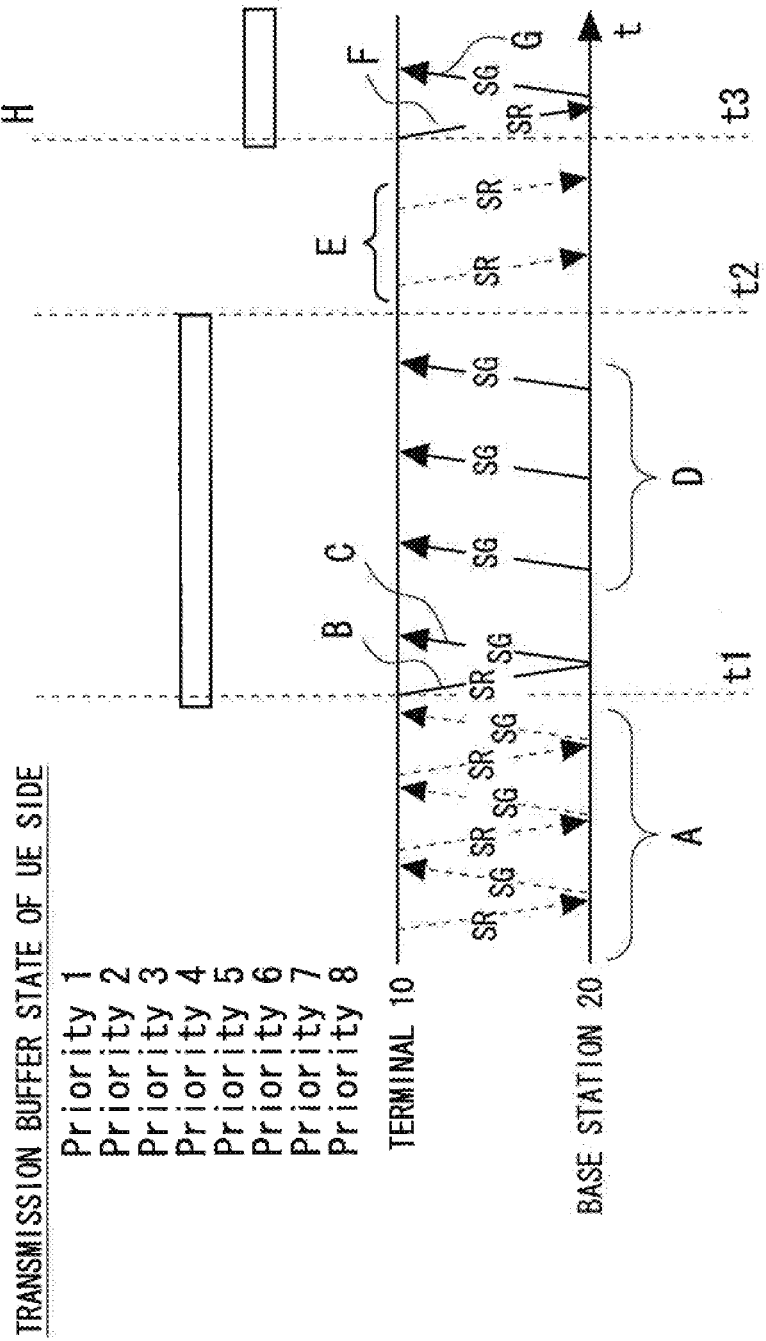

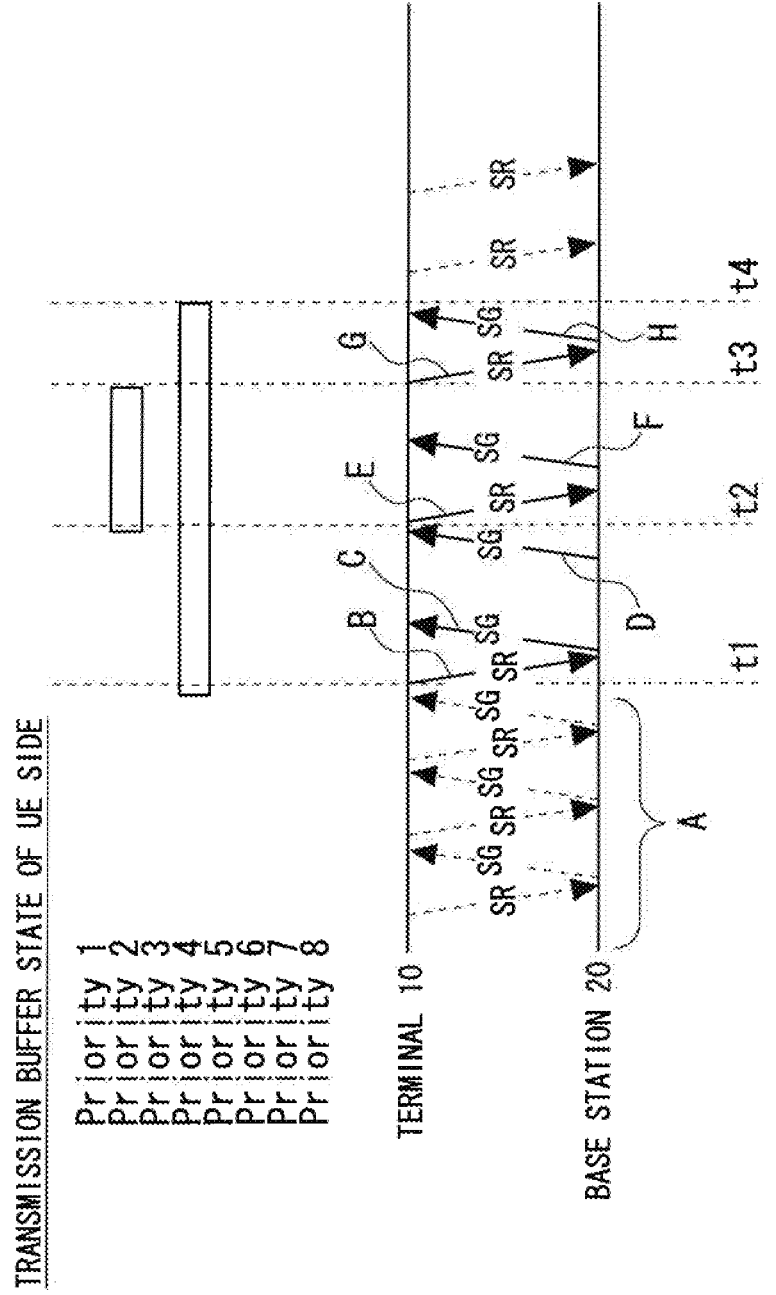

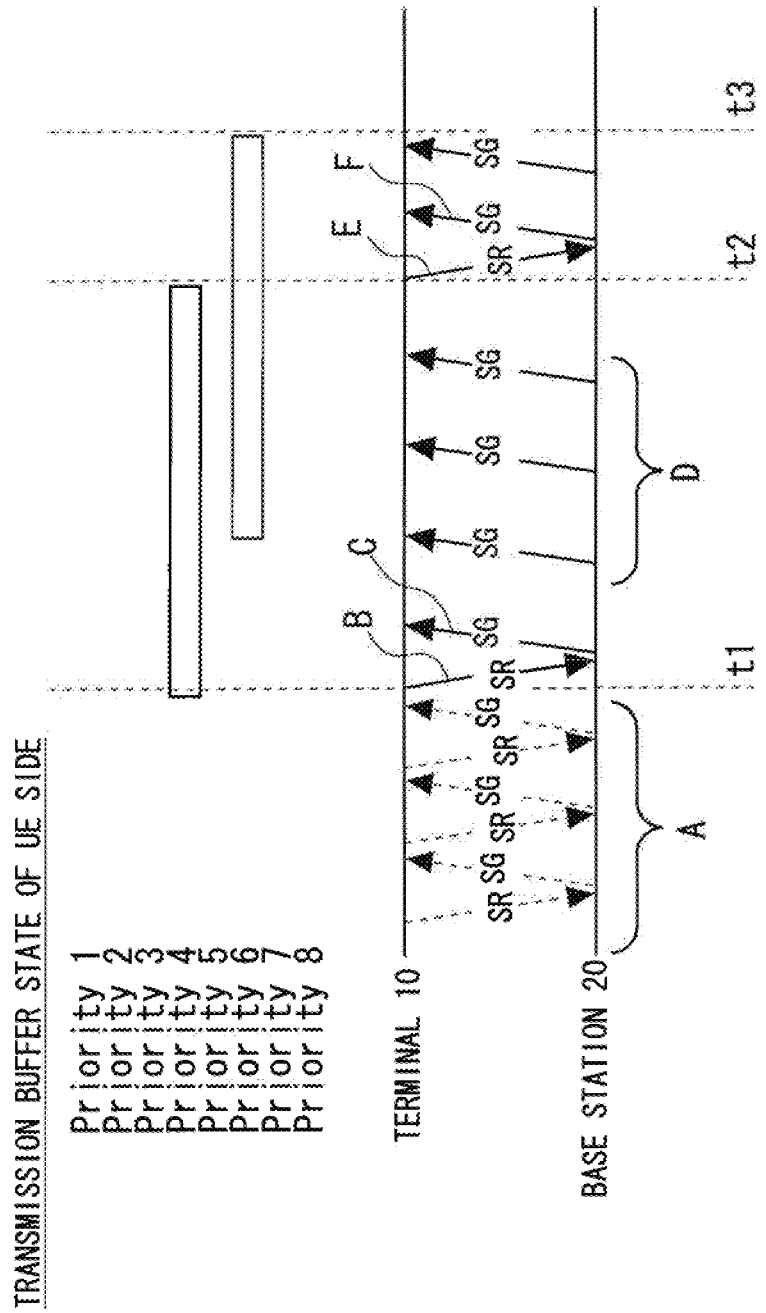

FIG. 9

| SUM OF BUFFER RETENTION AMOUNTS OF PRIORITIES HIGHER THAN THRESHOLD | SR TRANSMISSION CYCLE |
|---|---|
| $a_1 \leq Xmeas \leq a_2$ | $A1$ |
| $a_3 \leq Xmeas \leq a_4$ | $A2$ |
| $a_5 \leq Xmeas \leq a_6$ | $A3$ |
| • | • |
| • | • |
| • | • |
| $a_{n-3} \leq Xmeas \leq a_{n-2}$ | $An-1$ |
| $a_{n-1} \leq Xmeas \leq a_n$ | $An$ |

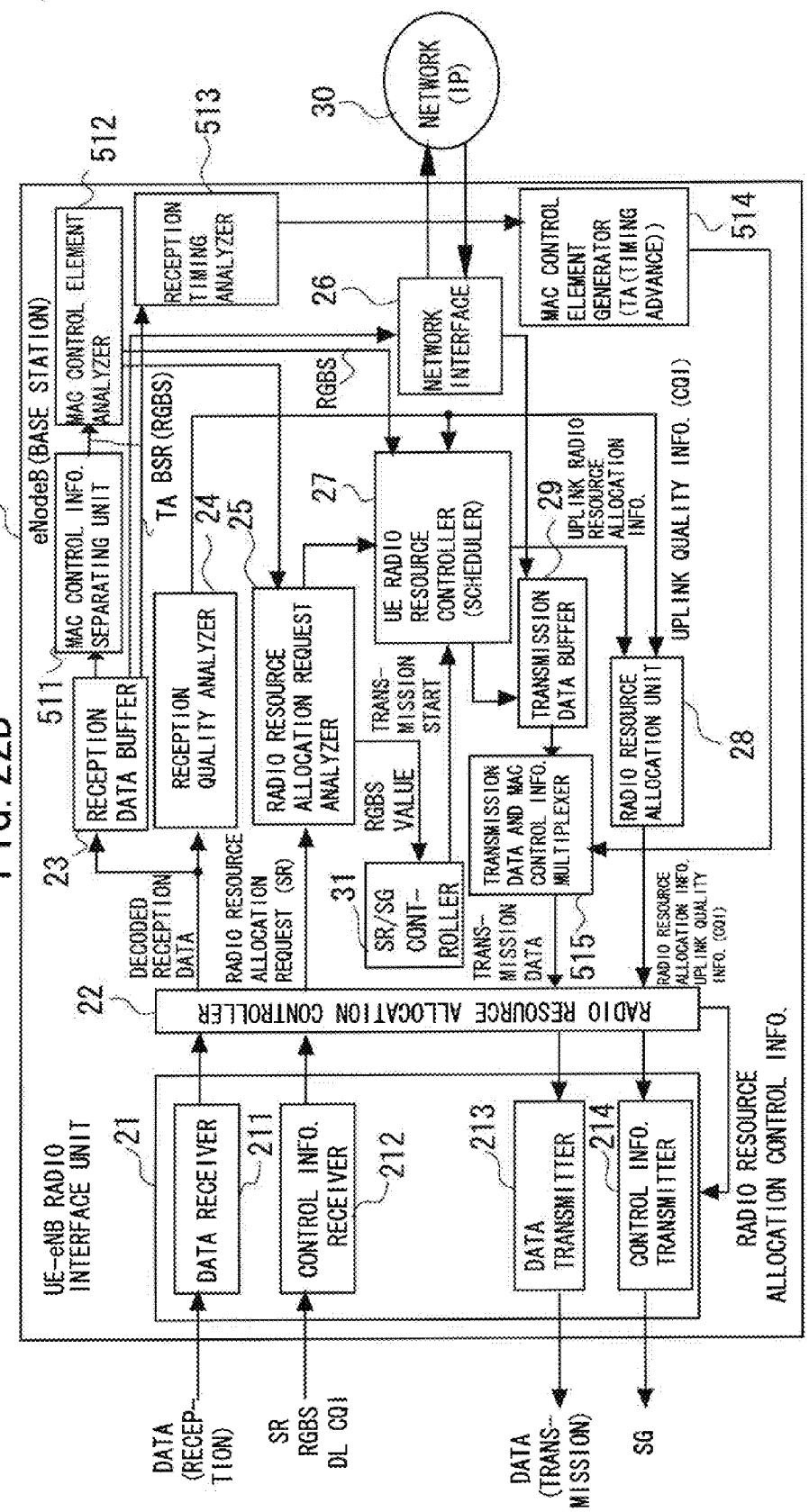

METHOD OF CONTROLLING ALLOCATION OF A RADIO RESOURCE FOR TRANSMITTING A RADIO RESOURCE ALLOCATION REQUEST

CROSS-REFERENCE TO RELATED APPLICATION

This application is based upon and claims the benefit of priority of the prior Japanese Patent Application No. 2008-285779, filed on Nov. 6, 2008, the entire contents of which are incorporated herein by reference.

FIELD

The present invention relates to a method of controlling a transmission cycle of a radio resource allocation request from a terminal device to a base station.

BACKGROUND

In the field of Third Generation Partnership Project Long Term Evolution (3GPPLTE), a control channel (L1/L2 control channel) for signaling and quality information notification is set between a radio terminal (terminal, called as user equipment: UE) and a radio base station (base station, called as eNode B) that are in a synchronized state. In order to request the base station to allocate a radio resource, the terminal uses an uplink control channel (L1/L2 control channel, physical uplink control channel: PUCCH) to issue a scheduling request (SR) as a radio resource allocation request message.

For example, in 3GPP LTE, the cycle and timing of SR transmission from the terminal are determined in advance in the base station and the terminal. In the case where the terminal, upon reaching the SR transmission cycle, is holding user data to be transmitted to the base station, the terminal transmits an SR to the base station. On the other hand, in the case where the terminal reaches the SR transmission cycle and is holding no user data to be transmitted at that point, the terminal does not transmit an SR.

On the base station side, control information including an SR may be received over the uplink control channel (UL L1/L2 control channel) according to the predetermined cycle and timing of SR transmission in the terminal. Receiving control information from the terminal, the base station analyzes the control information including an SR. The base station determines the allocation of an uplink radio resource to the terminal based on the result of the analysis. The base station then issues and transmits a message (scheduling grant: SG) for notifying the terminal of a radio resource allocation result (radio resource allocation information).

Receiving the SG issued from the base station, the terminal may transmit data to the base station with the use of a radio resource allocated according to radio resource allocation information that is contained in the SG.

In the uplink from the terminal to the base station, quality information (called as channel quality indicator (CQI)) is transmitted and received over the uplink control channel as control information that is not the SR described above. A CQI is used by the base station to keep track of the quality of the terminal and to execute control for ensuring the quality of communication with the terminal. An SR is used by the terminal to request the base station to allocate a radio resource for transmitting data when there is data to be transmitted to the base station.

As illustrated in FIG. 24, for example, the terminal is allocated a radio resource for an uplink control channel in a fixed given cycle. A radio resource for CQI transmission is allocated for each cycle. As control information that is not a CQI, parameters such as radio bearer group buffer status (RGBS: transmission buffer retention amount) and user equipment power headroom (UPH) are transmitted in the same transmission cycle as CQIs. For SRs, on the other hand, a transmission cycle longer than the CQI transmission cycle is fixedly defined, and an SR is transmitted by spending a domain that is intended to store a CQI.

[Patent document 1] Japanese Laid-open Patent Publication No. 2007-53747

Basically, an SR needs to be transmitted from the terminal to the base station only when the terminal has transmission data to be transmitted. However, the transmission of an SR from the terminal to the base station requires the allocation of an uplink radio resource for SR transmission. The base station side has no means of knowing when transmission data is held in the terminal and when the terminal is going to transmit an SR. This is why at present an uplink radio resource for SR transmission is allocated fixedly and cyclically to every terminal.

A drawback is that, because the terminal side does not transmit an SR to the base station when there is no transmission data, a radio resource allocated for SR transmission is wasted when the terminal does not transmit an SR.

Another drawback is that, because a radio resource for SR transmission utilizes part of a radio resource for CQI transmission as described above, the size of CQI information in an SR transmission cycle is limited by the SR. The terminal side therefore takes such measures, at least in an SR transmission cycle, as simplifying CQI information and postponing the transmission of part of CQI information until a subsequent cycle. Consequently, compared to when a radio resource for SR transmission is not allocated, the resolving power in terminal quality control on the base station side is lowered and the arrival of part of CQI information is delayed, which may deteriorate the quality of communication between the base station and the terminal.

Further, unnecessary SR transmission presents interference to other terminals, and may lead to deterioration in communication quality and a reduction in the maximum connected terminal count of the base station.

It is therefore desirable to increase the amount of radio resource allocated for CQI transmission while making the amount of radio resource allocated for SR transmission from the terminal to the base station as small as possible.

For example, consider improving the communication quality by uniformly stretching SR transmission cycles. In this case, however, a delay counted from the time when data to be transmitted is held in the terminal to the time when the terminal transmits an SR to the base station increases. The increase in data transmission delay is caused by the delayed allocation of an uplink radio resource to the terminal on the base station side. Furthermore, data stays for a longer period of time in a transmission buffer of the terminal, increasing the probability of data discard due to buffer full. Installing more transmission buffers leads to a rise in cost. Even with additional transmission buffers, the aforementioned problems of increase in delay, longer data stay in buffers, and data discard due to buffer full are not solved when the data communication rate is high.

SUMMARY

One of aspects of the present invention is a method of controlling allocation of a radio resource for a radio resource allocation request. The method of controlling allocation is applied to a base station which allocates, to a terminal, in response to the radio resource allocation request received from the terminal, a radio resource for transmitting retention data in a transmission buffer of the terminal to the base station, and which transmits to the terminal a radio resource allocation notification indicating a result of the allocation.

The method of controlling allocation includes: receiving an amount of retention data in the transmission buffer from the terminal; cyclically allocating the terminal a radio resource for the radio resource allocation request if the amount of retention data is zero; and determining a transmission cycle that is suited to the amount of retention data as a transmission cycle of the notification of radio resource allocation for transmitting the retention data in the transmission buffer if the amount of retention data is not zero, and stopping the allocation of a radio resource for the radio resource allocation request during cyclic transmission of the radio resource allocation notification.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 3B is a diagram illustrating a configuration example of the base station according to the first embodiment;

FIG. 4 is a diagram illustrating operations of the terminal and the base station in the first embodiment;

FIG. 5 is an explanatory diagram of a second operation example in the first embodiment;

FIG. 6 is an explanatory diagram of a third operation example in the first embodiment;

FIG. 9 is a diagram illustrating an example of an SR transmission cycle table;

FIG. 22B is a diagram illustrating an example of the configuration of a base station (eNode B) that is employed in the fifth embodiment;

DESCRIPTION OF EMBODIMENTS

Embodiments of the present invention are described below with reference to the drawings. Configurations of the embodiments are given as examples, and any aspects of the present invention are not limited to the configurations of the embodiments.

One of aspects of the present invention prevents unnecessary allocation of a radio resource for the transmission of a radio resource allocation request message (SR) by controlling the SR transmission cycle such that the cycle is optimized to the retention amount of a transmission buffer owned by a terminal (UE). An SR is transmitted to a base station (eNode B) when transmission data to be transmitted to the base station is held in the terminal, in order to request the base station to allocate an uplink radio resource.

Receiving the SR from the terminal, the base station determines which radio resource is to be allocated to the terminal based on the availability of uplink radio resources at that point, and transmits a radio resource allocation notification message (scheduling grant: SG) to the terminal, to thereby notify the terminal of the allocated radio resource. The terminal receives the SG from the base station and may transmit data to the base station with the use of the radio resource notified through the SG.

The terminal also regularly notifies the base station of the amount of retention data in its transmission buffer (buffer retention amount), so that the base station may know how much retention data is in the terminal side transmission buffer. The buffer retention amount is used to control the SR transmission cycle in a manner that optimizes the cycle to the buffer retention amount of each terminal. Useless allocation of a radio resource for SR transmission is thus avoided.

The data transmission capability, the transmission buffer size, and employed applications vary from terminal to terminal, and different terminals have different data stay lengths and ratios. Optimum SR transmission control is accomplished by varying the SR transmission cycle from terminal to terminal based on the buffer retention amount.

A description is given on scheduling of eNodeB (base station) and UE (terminal) in Third Generation Partnership Project Long Term Evolution (3GPP LTE) to which embodiments of the present invention may be applied. In 3GPP LTE, orthogonal frequency division multiple access (OFDMA) is used to divide a radio resource by time and frequency, so that time and frequency domains generated by the division (segment domains) may be allocated to terminals that are under the control of the base station.

The embodiments illustrate examples in which a resource allocation control method is applied to 3GPP, but the resource allocation method is not limited to 3GPP and also applicable to other systems (e.g., radio communication systems such as worldwide interoperability for microwave access (WiMAX) and radio local area network (LAN).

Figure 1:
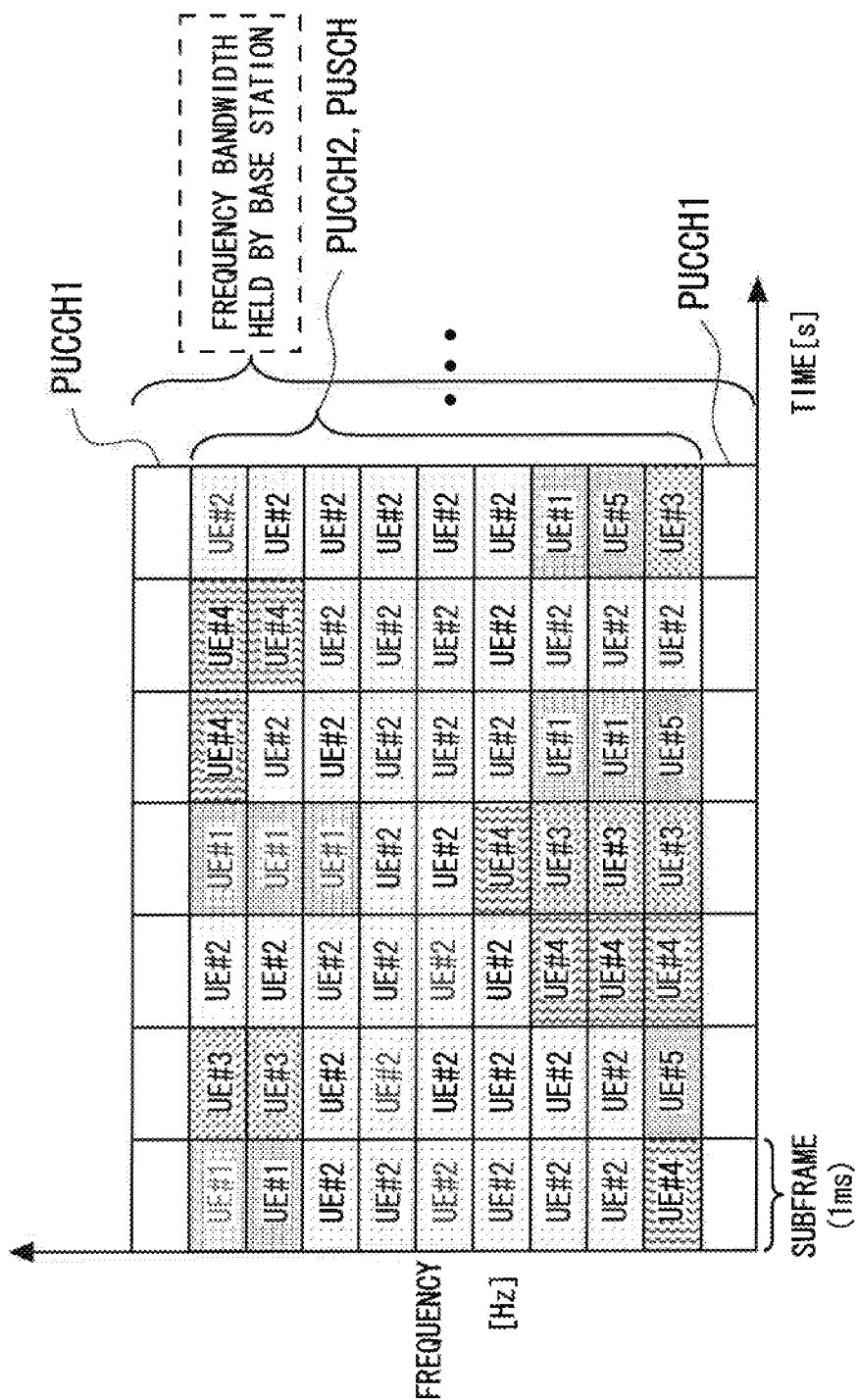
FIG. 1 is a diagram illustrating examples of a radio resource that a base station may allocate to each terminal.

FIG. 1 illustrates an example of radio resources that the base station may allocate to each terminal. As illustrated in FIG. 1, the time axis is divided by a given unit time (1 ms, for example) which is called a subframe. A frequency bandwidth that may be used by the base station (system frequency bandwidth) in one subframe may also be divided in the frequency direction, so that segment time and frequency domains generated by the division may be allocated to different terminals. The base station changes the frequency allocation status of each terminal from one subframe to another, thus accomplishing multiplexing of terminals by time division.

Examples of an uplink direction physical channel include UL L1/L2 control channel (PUCCH1, PUCCH2) and physical uplink shared channel (PUSCH). The PUCCH1 and the PUCCH2 are control-use physical channels for transmitting and receiving control information between a terminal and a base station. The PUSCH is a data communication-use physical channel for transmitting and receiving user data between a terminal and a base station. As the PUCCH1, domains having frequencies on the edges of the system frequency bandwidth are used. In other words, the uppermost and lowermost block rows in FIG. 1 are used as the PUCCH1. The PUCCH1 is regularly allocated to every terminal under the control of the base station (every terminal that is in synchronization with the base station). Domains of intermediate frequencies sandwiched between those of the PUCCH1 may be allocated as the PUCCH2 and the PUSCH.

FIG. 1 illustrates a state in which the base station allocates radio resources to a plurality of terminals (#1 to #5 in FIG. 1). In FIG. 1, each of blocks generated through partitioning by frequency and time constitutes the minimum unit of a radio resource that may be allocated to a single terminal. The base station allocates each terminal a frequency range and a time period that the terminal may use for communication. A terminal and the base station may transmit and receive data with the use of a frequency and time period determined by the base station.

The base station allocates many frequencies and time periods (=many radio resources) to a terminal that has high communication performance, a terminal that has a favorable communication environment (quality) (for example, a terminal that is favorable in terms of measurable quality information such as being not on the move or having good reception), or a terminal that has a lot of data to transmit or that is required to have a high data transfer rate, and allocates few frequencies and time periods (=few radio resources) to other terminals.

In the example of FIG. 1, a terminal UE#2 is allocated the most radio resources (segment domains), while a terminal UE#5 has the least allocation amount. It means that, in this example, the terminal UE#2 has high quality, or is high in transmission data amount and transmission rate, whereas the terminal UE#5 is low in transmission rate or quality.

Radio resource allocation is executed based on a comprehensive estimation made by the base station on the quality/status of each terminal and the amount of retention data in a data transmission buffer of the terminal. All these allocation processing steps are triggered by a radio resource allocation request in the form of an SR from the terminal side. The base station determines whether or not a requested radio resource may be allocated to the terminal by considering the quality information of the terminal, and allocates a radio resource according to the determination.

Figure 2:
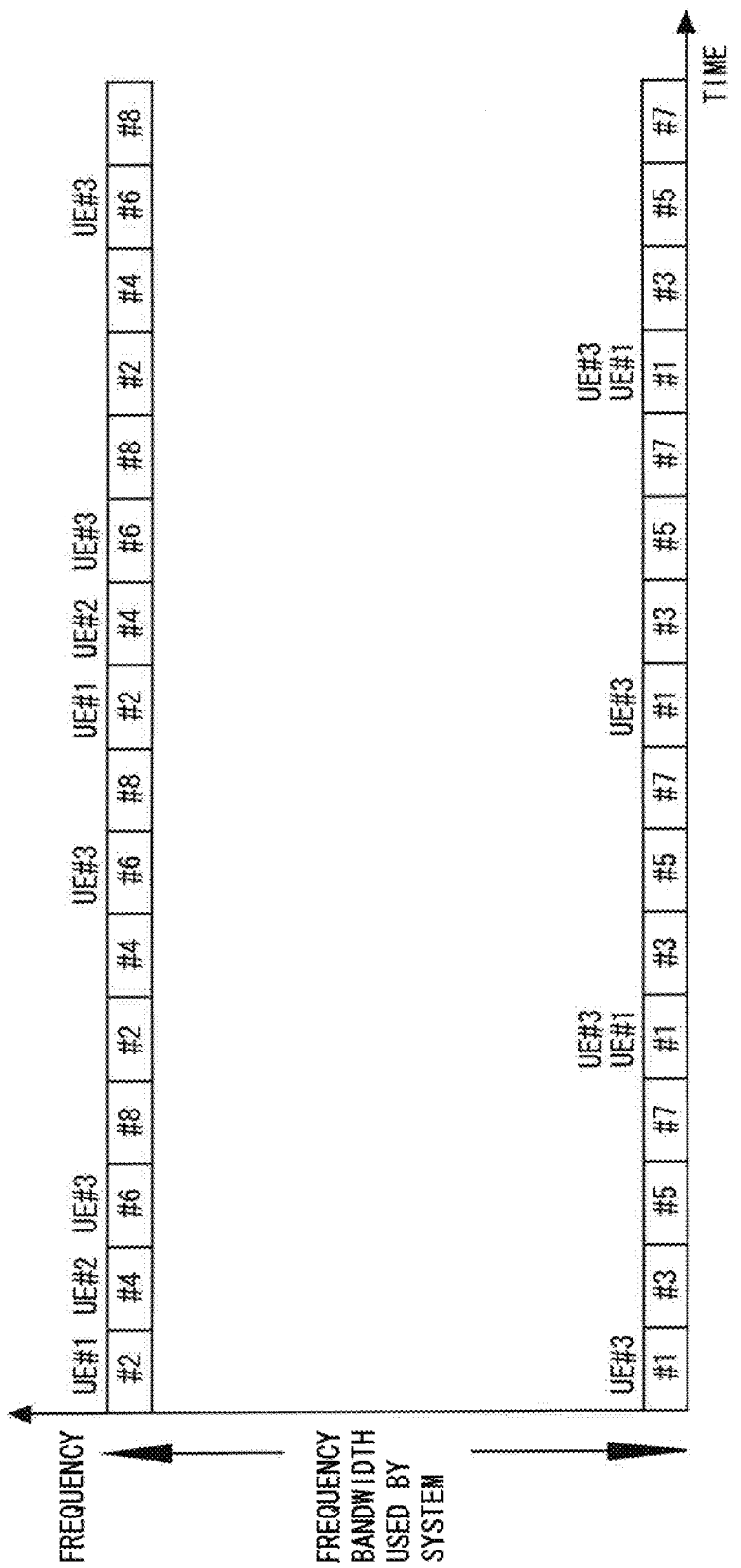
FIG. 2 is a diagram illustrating an example of a PUCCH1 described with reference to FIG. 1.

FIG. 2 is a diagram illustrating an example of the PUCCH1 which has been described with reference to FIG. 1. Control information flowing over the PUCCH1 is described with reference to FIG. 2. The PUCCH1 is divided into subframes along the time axis and the domains each have a PUCCH1 number. A terminal is mapped to each of the domains. For each terminal, initial allocation timing of the PUCCH1 bandwidths (ranges) and an allocation cycle thereof are determined fixedly, so that the terminal may transmit (use) a PUCCH1 bandwidth in a regular cycle. In the case where the same PUCCH1 number is given to a plurality of terminals in an overlapping manner (the case of UE#1 and UE#3 in FIG. 2), information from the terminals are multiplexed by code multiplexing.

The initial allocation timing and allocation cycle of PUCCH1 are specified in a parameter transmitted and received as a necessary parameter in a control procedure of radio resource control (RRC), which is executed when a terminal connects to the base station and is synchronized with the base station. The parameter is kept on the base station side for each terminal separately, and the parameters kept on the base station side are allocated sequentially to be delivered to the respective terminals. Once communication between the base station and a terminal starts, setting values specified by the parameter are never changed.

Control information transmitted from a terminal to the base station over the PUCCH1 includes the following:
(1) CQI information: Radio quality information of the downlink (DL)=signal-to-interference ratio (SIR) in the DL radio section.
(2) RGBS value: The index value of the amount of retention data in a transmission buffer for data that is held by the terminal and to be transmitted to the base station. A plurality of logical channels associated with a plurality of priority classes are set between the terminal and the base station. A transmission buffer is prepared for each priority class (logical channel). The retention amounts of the transmission buffers for the respective logical channels are thus reported individually.
(3) Scheduling request (SR): A PUSCH (data communication-use physical channel) allocation request message transmitted from the terminal to the base station.
(4) UE power headroom (UPH): The ratio of the current transmission power to the terminal's maximum transmission power. UPH is used to control the transmission power of the terminal, and indicates the UE's surplus transmission power. For example, UPH is an index value calculated by (UE's maximum transmission power)/(UE's transmission power at the time), and a larger UPH value means that the UE has more room to increase power.

<First Embodiment>

In a first embodiment, a first method is described in which a terminal does not transmit an SR to the base station until a transmission buffer (RLC buffer) of the terminal is emptied.

In the first method, until the transmission buffer retention amount of a terminal which is notified by the terminal to the base station becomes zero, the base station does not allocate a radio resource for SR transmission and only allocates a radio resource for data transmission (issues an SG cyclically). The terminal, too, does not transmit an SR until the buffer retention amount becomes zero.

Figure 3A:
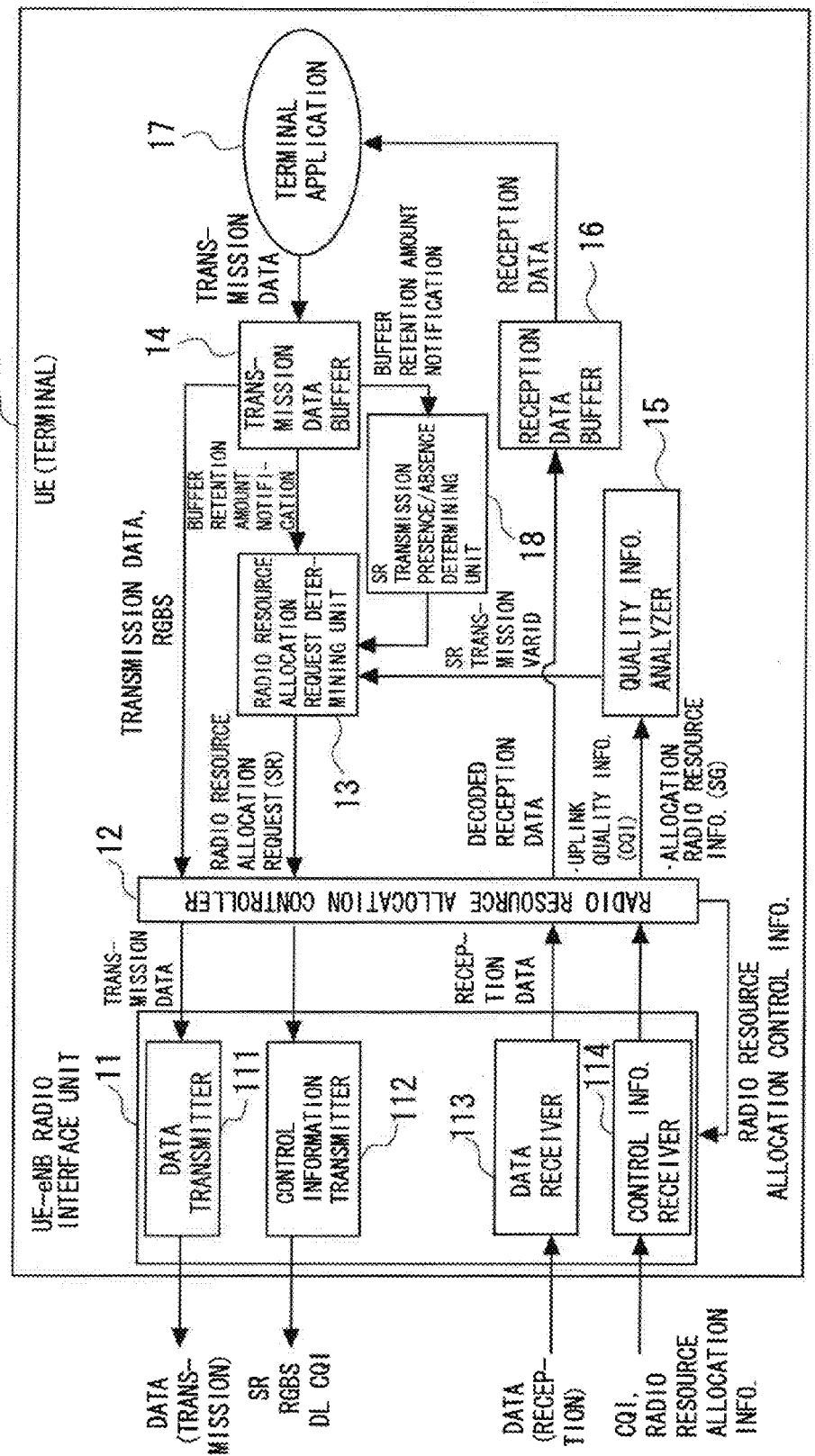
FIG. 3A is a diagram illustrating a configuration example of the terminal according to a first embodiment.

FIG. 3A is a diagram illustrating a configuration example of a terminal (UE) 10 in the first embodiment, and FIG. 3B is a diagram illustrating a configuration example of a base station (eNode B) 20 in the first embodiment. The terminal 10 and the base station 20 illustrated in FIG. 3A and FIG. 3B have configurations that are applicable to a 3GPP LTE system. Reception of the terminal 10 in FIG. 3A is the downlink (DL) and reception on the side of the base station 20 in FIG. 3B is the uplink (UL).

In FIG. 3A, the terminal 10 includes a UE-eNodeB radio interface unit 11 (radio interface unit 11), a radio resource allocation controller 12 (allocation controller 12), which is connected to the radio interface unit 11, a radio resource allocation request determining unit 13 (allocation request determining unit 13), which is connected to the allocation controller 12, a transmission data buffer 14 (corresponding to transmission buffers), which is connected to the allocation request determining unit 13, a quality information analyzer 15, which is connected to the allocation controller 12 and the allocation request determining unit 13, a reception data buffer 16, which is connected to the allocation controller 12, and a terminal application 17, which is connected to the transmission data buffer 14 and the reception data buffer 16. The terminal 10 also has an SR transmission necessity determining unit 18, which is provided between the transmission data buffer 14 and the allocation request determining unit 13.

The radio interface unit 11 includes a data transmitter 111, which transmits transmission data (user data) from the allocation controller 12 to the base station 20, a control information transmitter 112, which transmits control information from the allocation controller 12 to the base station 20, a data receiver 113, which receives user data from the base station 20, and a control information receiver 114, which receives control information from the base station 20.

The terminal application 17 generates data to be transmitted to the base station 20, and sends the data to the transmission data buffer 14. The transmission data buffer 14 temporarily accumulates (keeps) data. The amount of backlogged data (data retention amount) in the transmission data buffer 14 is notified to the allocation request determining unit 13.

The transmission data buffer 14 includes a plurality of buffer areas (transmission buffers) associated with a plurality of logical channels, which are provided for a plurality of priority classes defined in advance, and accumulates (keeps) data of different priority classes in different buffer areas (transmission buffers). The terminal 10 therefore notifies the base station 20 of the buffer retention amount of the transmission data buffer 14 on a priority class (logical channel) basis.

The allocation request determining unit 13 generates a radio resource allocation request (SR) according to the retention amount of transmission data and a quality analysis result which is provided by the quality information analyzer 15, and sends the SR to the allocation controller 12.

The allocation controller 12 uses a control channel (PUCCH1) in a cycle and timing allocated to its own terminal to transmit control information including an SR to the base station 20, under the control of the control information transmitter 112. The allocation controller 12 also uses a radio resource (PUSCH) allocated by the base station 20 to transmit transmission data that is accumulated in the transmission data buffer 14 to the base station 20, under the control of the data transmitter 111. The allocation controller 12 gives radio resource allocation control information to the radio interface unit 11, so that transmission data and control information are transmitted with the use of a time period and frequency (radio resource) allocated in advance.

User data from the base station 20 is received by the data receiver 113. The received data is decoded. The decoded received data is temporarily accumulated in the reception data buffer 16, and supplied to the terminal application 17.

Control information (including radio resource allocation information (SG)) from the base station 20 is received by the control information receiver 114. The control information is analyzed by the allocation controller 12, and uplink quality information (CQI) and allocated radio resource information (SG) are given to the quality information analyzer 15. The quality information analyzer 15 notifies a result of analyzing the CQI and the allocated radio resource information to the allocation request determining unit 13.

To give a more detailed description, as illustrated in FIG. 1, the frequency of a radio resource allocated by the base station changes on a subframe (1 ms) basis. The radio interface unit 11 may therefore change the transmission/reception frequency on a subframe basis to match a transmission/reception frequency determined by the allocation controller 12.

As illustrated in FIG. 3A, the terminal 10 receives data and control information (channel quality indicator (CQI) and radio resource allocation information (SG)) from the base station 20. The CQI is a value indicating the quality of data transfer from the terminal 10 to the base station 20. Data transmitted from the terminal 10 to the base station 20 is more likely to be transferred normally without an error when the CQI value is higher.

An SG received at the terminal 10 is notified to the allocation controller 12 and the quality information analyzer 15. At this point, the allocation controller 12 recognizes to where a radio resource (frequency and time period) for the next data transmission/reception is allocated, notifies the radio interface unit 11 of the correct frequency and time period in preparation for the next data transmission/reception, and executes the next data transmission/reception session. The allocation controller 12 also determines which frequency and time period the quality information (CQI) is about.

The CQI information is analyzed in the quality information analyzer 15, which analyzes the quality at which data is delivered to the base station 20 in the previous data transmission from the terminal 10 to the base station 20. The quality information analyzer 15 thus determines the quality of communication from the terminal 10 to the base station 20 (UL direction), and notifies the determined communication quality to the allocation request determining unit 13.

Based on the communication quality information which is notified from the quality information analyzer 15 and the buffer retention amount which is notified from the transmission data buffer 14, the allocation request determining unit 13 determines at which communication rate the terminal 10 needs to communicate with the base station 20 in a subsequent subframe, and how much radio resource should be requested to the base station 20. The allocation request determining unit 13 then generates a scheduling request (SR) and notifies the allocation controller 12.

The allocation controller 12 may transmit, along with transmission data, control information (RGBS, DL CQI, UPH) including the SR (radio resource allocation request), in accordance with the SG (radio resource allocation information) received from the base station 20.

The SR transmission necessity determining unit 18 receives the buffer retention amount (RGBS) from the transmission data buffer 14, determines whether or not the buffer retention amount is zero, and notifies the allocation request determining unit 13 of a decision made about the necessity of SR transmission according to the determination result.

The base station 20 fixedly and cyclically allocates the terminal 10 control channel frequency ranges (PUCCH1, see FIGS. 1 and 2) as a radio resource for transmitting control information.

Using a radio resource for transmitting control information, the terminal 10 transmits not only an SR but also the RGBS (data retention ratio of the transmission data buffer 14 of the terminal 10=ratio of retention data in the transmission data buffer of the terminal 10), the DLCQI (quality information of downlink data from the base station 20 to the terminal 10 which is measured on the side of the terminal 10), and the UPH (UE power headroom=power currently used for transmission in relation to the maximum transmission power of the terminal 10=surplus transmission power of the terminal 10).

Figure 24:
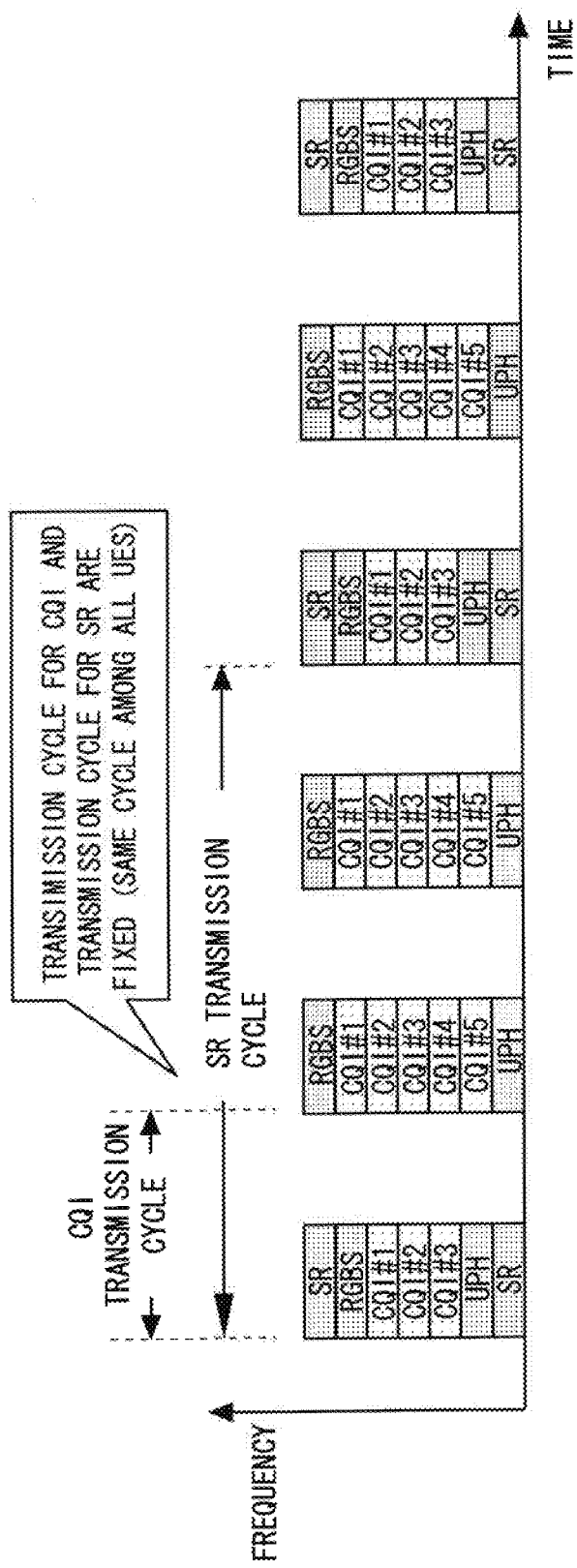
FIG. 24 is an explanatory diagram illustrating an example of an uplink control channel radio resource which is allocated to the terminal in a fixed given cycle.

As illustrated in FIG. 24, the DLCQI, the RGBS, and the UPH are transmitted for each radio resource allocated fixedly and cyclically to the terminal 10. An SR, on the other hand, is transmitted when it is determined to transmit an SR, with the use of a domain that is originally intended for a CQI.

In FIG. 3B, the base station 20 includes an eNodeB-UE radio interface unit 21, a radio resource allocation controller 22, which is connected to the radio interface unit 21, a reception data buffer 23, a reception quality analyzer 24, and a radio resource allocation request analyzer (allocation request analyzer) 25, the three of which are connected to the allocation controller 22, a network interface 26, which is connected to the reception data buffer 23, a UE radio resource controller (scheduler) 27, which is connected to the allocation request analyzer 25, and a radio resource allocating unit 28 and a transmission data buffer 29, the two of which are connected to the network interface 26 and the scheduler 27.

The network interface 26 is connected to a network (IP network) 30. The radio resource allocating unit 28 and the transmission data buffer 29 are connected to the allocation controller 22. In addition, the base station 20 also has an SR/SG controller 31 provided between the allocation request analyzer 25 and the scheduler 27.

In addition, the radio interface unit 21 has a data receiver 211, which receives data from the terminal 10, a control information receiver 212, which receives control information from the terminal 10, a data transmitter 213, which transmits data to the terminal 10, and a control information transmitter 214, which transmits control information to the terminal 10.

Different terminals 10 are allocated different frequencies, and hence the allocation controller 22 of the base station 20 may obtain data and control information from the transmission/reception target terminal 10 by selecting a frequency that is allocated to the target terminal 10.

The base station 20 may employ as the allocation controller 22 and the radio interface unit 21 components whose functions are equivalent to the functions of the components loaded in the terminal 10 (FIG. 3A). However, on the base station side, the fact that the base station 20 transmits to and receives from a plurality of terminals 10 is to be taken into consideration. The radio interface unit 21 and the radio resource allocation controller 22 therefore determine a radio resource (frequency and time period) for each terminal as a managing target individually, separate data and control information among respective terminals, and process each terminal separately.

Data from the terminal 10 is received by the data receiver 211 and, after undergoing decryption processing, given to the reception data buffer 23 and the reception quality analyzer 24. The decrypted reception data is temporarily kept in the reception data buffer 23, read out to the network interface unit 26 at given timing, and transmitted to the network 30.

Based on the decrypted reception data, the reception quality analyzer 24 generates CQI information (uplink quality information) indicating the communication quality of the uplink, and gives the CQI information to the UE radio resource allocation controller (scheduler) 27 and the radio resource allocating unit 28.

On the other hand, the control information receiver 212 receives control information (SR, RGBS, DLCQI, UPH) from the terminal 10 and gives the control information to the allocation controller 22. The allocation controller 22 gives the control information to the allocation request analyzer 25, and the allocation request analyzer 25 analyzes the contents of the SR (radio resource allocation request) in the control information, and gives the result of the SR analysis to the scheduler 27.

When the SR/SG controller 31 receives the RGBS value in the control information from the allocation request analyzer 25, the SR/SG controller 31 determines whether or not the RGBS value is zero at this time. When the RGBS value is found to be zero, the SR/SG controller 31 instructs the scheduler 27 to allocate a radio resource for SR transmission in a basic SR transmission cycle.

When the RGBS value is not zero (is positive), on the other hand, the SR/SG controller 31 determines an SG transmission cycle suited to the RGBS value (buffer retention amount), and gives the scheduler 27 the SG transmission cycle and an instruction to stop allocating a radio resource for SR transmission. An SG transmission cycle suited to the RGBS value, in other words, an SG transmission cycle that is sufficient for the reception of retention data in the buffer is determined, and the determined SG transmission cycle is notified to the scheduler 27.

The scheduler 27 uses quality information (ULCQI) from the reception quality analyzer 24, radio resource allocation information from the allocation request analyzer 25, and the SG transmission cycle from the SR/SG controller 31 to calculate radio resources (for both the control channel and the user channel) to be allocated to the terminal 10 that has made the request in a subsequent subframe. The scheduler 27 then notifies radio resource allocation information to the radio resource allocating unit 28 and the transmission data buffer 29. About the allocation (scheduling) of a radio resource for SR transmission at this time, the scheduler 27 follows an instruction from the SR/SG controller 31.

The radio resource allocating unit 28 generates in an SG transmission cycle an SG (Scheduling Grant) based on the radio resource allocation information from the scheduler 27, and notifies the SG along with the ULCQI (uplink communication quality information) from the reception quality analyzer 24 to the radio interface unit 21. The SG and the ULCQI are transmitted from the control information transmitter 214 to the terminal 10.

Note that data from the network interface 26 accumulated in the transmission data buffer 29 is read according to radio resource allocation information (schedule for allocating a radio resource to each terminal) provided from the scheduler 27, and transmitted to the transmission destination terminal 10 through the allocation controller 22 and the data transmitter 213.

In the case where the allocation of a radio resource for SR transmission is stopped, a radio resource originally intended for SR transmission is still allocated to the terminal 10. The terminal 10 in this case uses the radio resource for transmitting SR information to transmit information for improving the communication quality, such as CQI information, in a cycle that is originally determined as an SR transmission cycle. Such processing in the terminal 10 is executed in accordance with an instruction from the base station 20. The instruction from the base station 20 is notified to the terminal 10 as part of an SG that is issued in response to an SR.

FIG. 4 is a diagram illustrating the operations of the terminal 10 and the base station 20 in the first embodiment. The terminal 10 illustrated in FIG. 3A processes data received from the base station 20 in the data receiver 111, and decrypts control information (ULCQI, SG) received from the base station in the control information receiver 114. The control information (ULCQI, SG) is notified to the allocation controller 12.

The allocation controller 12 uses a radio resource that is allocated by the base station 20 according to the SG, reads transmission data out of the transmission data buffer 14, and gives the transmission data to the data transmitter 111. User data transmission is executed in this manner.

While the transmission data buffer 14 of the terminal 10 does not have transmission data (while the RGBS value received at the base station 20 is zero), the base station 20 executes processing of cyclically allocating a control channel radio resource for SR transmission as in prior art (A in FIG. 4).

At a subsequent time point t1, transmission data is accumulated in the transmission data buffer 14 (for example, Priority 4) of the terminal 10. Then, the SR transmission necessity determining unit 18 of the terminal 10 then instructs the allocation request determining unit 13 to transmit an SR, and the allocation request determining unit 13 of the terminal 10 generates control information including an SR only once and supplies the control information to the allocation controller 12. In this way, an SR is transmitted to the base station 20 only once to request the allocation of a radio resource for data transmission. SR transmission is executed only once, and no SR is transmitted subsequently.

Receiving the SR, the base station 20 performs the following processing. That is, control information (SR, RGBS, CQI) received from the terminal 10 is notified to the allocation request analyzer 25. The allocation request analyzer 25 checks the retention amount (RGBS value) of the transmission data buffer 14 of the terminal 10 which has been notified as control information, and the data communication rate (for example, the modulation method employed (QPSK, 16 QAM, 256 QAM or the like), the TBS (Transport Block Size) size, and whether or not MIMO (Multiple-Input Multiple-Output) has been applied) of the terminal 10 at that time.

The allocation request analyzer 25 subsequently generates radio resource allocation information for securing enough radio resource to transmit retention data in the transmission data buffer 14 at the data communication rate of this terminal 10. The allocation request analyzer 25 gives the radio resource allocation information to the scheduler 27, and gives the RGBS value to the SR/SG controller 31.

The SR/SG controller 31 determines an SG transmission cycle for having the terminal 10 transmit as much data as indicated by the RGBS value, and gives the SG transmission cycle to the scheduler 27. The SG/SR controller 31 at this point gives the scheduler 27 an instruction to stop the cyclic allocation of a radio resource for SR transmission.

Note that, as a parameter for determining the cycle of SG transmission, the data communication rate may further be used in addition to the RGBS. A table may be generated in advance by associating an SG transmission cycle with a parameter such as the RGBS value and the data communication rate, so that the SR/SG controller 31 may obtain the associated SG transmission cycle from the table. In short, the SR/SG controller 31 may have an RGBS-SG transmission cycle association table. Further, when an SG transmission cycle is determined, an SG associated with the SG transmission cycle may be obtained in the SR/SG controller 31. The SG in this case may be obtained from the table along with the SG transmission cycle. In short, an SG transmission cycle and an SG may be registered in the association table.

When an SG and an SG transmission cycle are determined in this manner, the scheduler 27 stops allocating this terminal 10 a radio resource for SR transmission, and allocates a radio resource for executing data transmission from the terminal 10 in response to the cyclic issuing of the SG. This radio resource allocation result is notified as uplink radio resource allocation information (SG) to the radio resource allocating unit 28 along with quality information, and is transmitted to the terminal 10 through the allocation controller 22 and the control information transmitter 214 (C in FIG. 4).

Note that the SG transmission cycle is notified to the allocation controller 22. The allocation controller 22 operates such that the control information transmitter 214 transmits control information including the SG to the terminal 10 in the SG transmission cycle through downlink.

In this manner, upon reception of an SR from the terminal 10, an SG and an SG transmission cycle are determined with the buffer retention amount (RGBS) taken into consideration. The allocation of a radio resource for SR transmission is then stopped for the terminal 10 and, at the same time, the cyclic issuing of the SG is started to allocate the terminal 10 a radio resource for data transmission.

After that, the radio resource allocating processing for SR transmission on the side of the base station 20 and the processing of SR transmission from the terminal 10 are not executed until the transmission data buffer 14 of this terminal 10 is emptied (until the buffer retention amount (RGBS) notified from the terminal 10 becomes zero). The base station 20 cyclically transmits the SG to the terminal 10 and allocates a radio resource for data transmission from the terminal 10 (D in FIG. 4).

When the transmission data buffer 14 is subsequently emptied at a time point t2, for example, the SR/SG controller 31 recognizes this fact from the RGBS value notified from the terminal 10. Then the SR/SG controller 31 gives an instruction to the scheduler 27, and the scheduler 27 follows the instruction from the SR/SG controller 31 to stop cyclic SG transmission and allocation of a radio resource for data transmission to this terminal 10, and to resume cyclic radio resource allocation for the transmission of a new SR (G in FIG. 4).

The terminal 10 does not transmit the SR until the next data is accumulated in the transmission data buffer 14 (E in FIG. 4 (a dashed line represents non-transmission)). After that, when the next data (Priority 5) is subsequently accumulated in the transmission data buffer 14 at a time point t3, for example, the operation described above is executed again (F, G in FIG. 4).

Note that the base station 20 may detect that the buffer retention amount notified from the terminal 10 is zero as follows. That is, cyclic radio resource allocation for control information such as the RGBS and the CQI is not suspended in a section where the allocation of a radio resource for SR transmission is stopped. The allocation request analyzer 25 may therefore recognize the buffer retention amount (RGBS value) cyclically. The fact that the RGBS value has become zero is thus detected.

FIG. 5 is an explanatory diagram of a second operation example in the first embodiment. FIG. 5 illustrates an example of an operation executed when data is accumulated in a buffer area for a logical channel whose priority class is higher than that of a logical channel over which data is being transmitted. In this case, while the transmission of the data of the priority class is continued, SR transmission processing is executed for the higher priority class data, and then a switch is made to the transmission of the higher priority class data.

In FIG. 5, the part where Priority 4 data is accumulated in the transmission data buffer 14, an SR is transmitted from the terminal 10 (B in FIG. 5), an SG is transmitted in response to the SR (C in FIG. 5), and then cyclic SG transmission is executed while the allocation of a radio resource for SR transmission is stopped (D in FIG. 5), is the same as in the first operation example illustrated in FIG. 4.

After that, assume that data of Priority 2 which is higher than Priority 4 is accumulated in the transmission data buffer 14 of the terminal 10 at the subsequent time point t2. Here, the terminal 10 has been notifying the base station 20 of the buffer retention amount on a priority class (logical channel) basis through cyclic RGBS transmission.

The base station 20 receives from the terminal 10 the buffer retention amount (RGBS) for each priority class of logical channel. The base station 20 may therefore detect a retention in a buffer for a priority class (Priority 2) higher than a priority class (Priority 4) of the logical channel over which data transfer is currently being executed. This detection is performed by the SR/SG controller 31.

Upon detection of a retention in a high priority class buffer, the following processing is executed in the base station 20. That is, the SR/SG controller 31 allocates the terminal 10 a radio resource for SR transmission without stopping the cyclic SG transmission for the Priority 4 data. This radio resource allocation for SR transmission may be notified to the terminal 10 through the cyclic SG transmission (for example, the SG "D" in FIG. 5).

The terminal 10 receives the SG to detect that a radio resource for SR transmission has been allocated. Then, the terminal 10 then issues control information (SR, RGBS, CQI) for the transmission of the Priority 2 data, and transmits the control information to the base station 20 (E in FIG. 5). The base station 20 (SR/SG controller 31) receives the control information from the terminal 10 and, based on this control information, determines an SG and an SG transmission cycle for Priority 2. Thereafter, SG transmission for Priority 4 is switched to SG transmission for Priority 2. In other words, the SR/SG controller 31 instructs the scheduler 27 to stop Priority 4 SG transmission and at the same time execute allocation for Priority 2 SG transmission. An SG for the transmission of the Priority 2 data is thus transmitted cyclically (F in FIG. 5). During the cyclic SG transmission for Priority 2, the allocation of a radio resource for SR transmission is stopped.

When the terminal 10 finishes transmitting the Priority 2 data (when the base station 20 finishes receiving the data), the base station 20 resumes the SG transmission for the Priority 4 data (G in FIG. 5). The SG transmission may be resumed by the following two methods.

(Method 1) As in the first operation example, detecting the completion of the data reception (RGBS value=0) (t3 in FIG. 5), the base station 20 resumes the cyclic allocation of a radio resource for SR transmission. This enables the terminal 10 to transmit an SR about the transmission of the remaining Priority 4 data (G in FIG. 5). Based on this SR, the base station determines an SG and an SG transmission cycle for the transmission of the remaining Priority 4 data and, through cyclic SG transmission (H in FIG. 5), executes the transmission/reception of the Priority 4 data.

(Method 2) Through cyclic reception of the RGBS value, the base station 20 may recognize the buffer retention amount at the time when the SG transmission for the Priority 4 data is stopped. Upon completion of Priority 2 reception, the base station 20 obtains an SG and an SG cycle from the buffer retention amount at the time of the interruption of the Priority 4 transmission, and resumes the cyclic SG transmission.

FIG. 6 is an explanatory diagram of a third operation example of the first embodiment. The third operation example illustrates an operation in a case where, when cyclic SG transmission is being conducted for a priority class (Priority 4) data, the base station 20 detects a retention in a buffer for a priority class (e.g., Priority 6) lower than this priority class.

In FIG. 6, the part where the allocation of a radio resource for SR transmission is stopped while the cyclic SG transmission for Priority 4 is executed is the same as the part in the second operation example (A to D in FIG. 6).

Before the reception of the Priority 4 data is completed, the base station 20 may recognize the retention (RGBS value) in the buffer for the priority class (Priority 6) lower than Priority 4 through the cyclic reception of control information from the terminal 10. The base station 20 in this case uses one of the following two methods to start the transmission/reception of the Priority 6 data upon completion of the reception of the Priority 4 data.

(Method 1) When the reception of the Priority 4 data is completed, the base station 20 performs cyclic allocation of a radio resource for SR transmission and enters the state of waiting for the reception of an SR for the lower priority class (Priority 6) data. The terminal 10 in this case executes SR transmission (F, G in FIG. 6). Subsequent steps are the same as described above. An SG and an SG transmission cycle are determined and cyclic SG transmission is executed whereas radio resource allocation for SR transmission is stopped.

(Method 2) When the reception of the Priority 4 data is finished, the base station 20 determines an SG and an SG transmission cycle from the Priority 6 buffer retention amount, which has been obtained by that point, without executing cyclic allocation of a radio resource for SR transmission, and starts SG transmission. The terminal 10 in this case waits for the reception of the SG without transmitting an SR.

When the transmission/reception of the Priority 6 data is subsequently finished bringing down the buffer retention amount in the terminal 10 to zero, the base station 20 enters the state of cyclically allocating an uplink radio resource for SR transmission again.

Figure 7:
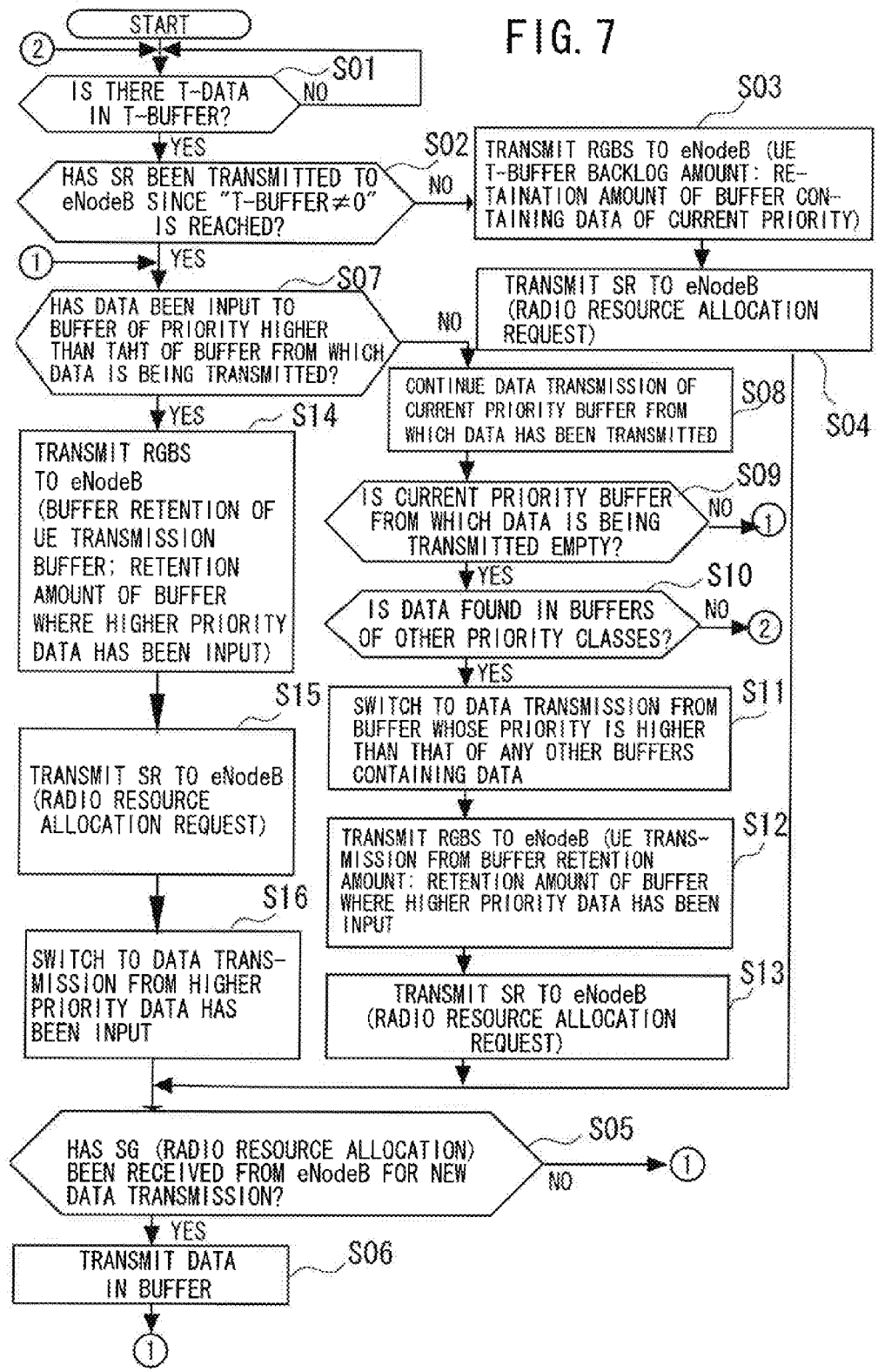
FIG. 7 is a flow chart illustrating an example of processing on the terminal side in the first embodiment.

FIG. 7 is a flow chart illustrating an example of processing on the side of the terminal 10 in the first embodiment. In FIG. 7, when data is accumulated in the transmission data buffer 14 (buffer retention amount≠0) (Yes in S01), and an SR has not been transmitted (No in S02), control information including an SR and the RGBS is transmitted to the base station 20 (S03, S04). SR transmission is executed only once and no SR is transmitted subsequently.

The terminal 10 then waits for the base station 20 to transmit an SG for new data transmission (to transmit an SG in response to the SR). Upon reception of the SG (Yes in S05), data in the buffer is transmitted according to the SG (S06).

The processing then proceeds to S07 where the terminal 10 determines whether or not data is accumulated in a buffer of a priority class higher than the priority class of the buffer from which data is being transmitted. At this time, in the case where data is not accumulated in a higher priority class buffer (No in S07), the data transmission of the current priority class buffer is continued (S08).

Thereafter, the terminal 10 determines whether or not the current priority class buffer from which data is being transmitted is empty (S09). In the case where the buffer is not empty (No in S09), the processing returns to S07. In the case where the buffer is empty (Yes in S09), whether or not data is accumulated in a buffer for any other priority class is determined (S10). In the case where no data is accumulated (No in S10), the processing returns to S01.

In the case where there is accumulated data (Yes in S10), on the other hand, the target of the data transmission is switched to a buffer whose priority class is highest among buffers that have accumulated data at that point (S11). An RGBS and SR about data in this buffer whose priority class is highest at present are transmitted to the base station (S12, S13). The processing then proceeds to S05.

On the other hand, in the case where it is found in S07 that data is accumulated in a higher priority class buffer (Yes in S07), an RGBS and SR about the higher priority class data are transmitted to the base station 20 (S14, S15). The terminal 10 then waits for the reception of an SG about the higher priority class data, and the reception of the SG triggers a switch to the higher priority class data as data to be transmitted. Thereafter, the processing proceeds to S05.

According to the processing of FIG. 7, the terminal 10 operates as follows. That is, when transmission data is accumulated in one transmission buffer, the terminal 10 transmits an SR only once and enters the state of waiting for an SG. The terminal 10 then transmits the data in response to the cyclic reception of the SG. Then, after every piece of data to be transmitted is transmitted, bringing down the buffer retention amount to zero, when transmission data is received making the buffer retention amount≠0 again, the terminal 10 subsequently again transmits an SR only once.

However, in the case where transmission data associated with a logical channel whose priority class is higher than the priority class of the logical channel over which data is currently being transmitted arrives at the terminal 10, the terminal 10 immediately transmits an SR in order to request the base station 20 to allocate a radio resource for data transmission over the higher priority class logical channel. Until an SG for the higher priority class is received from the base station 20, the terminal 10 continues SR transmission while maintaining the data transmission that has been conducted by the time.

Similarly, SR transmission is not executed when data is accumulated in a transmission buffer for a higher priority class logical channel, or until the retention amount of the current priority class transmission buffer from which data is being transmitted.

At the time when the transmission buffer for the higher priority class logical channel is emptied, the terminal 10 executes SR transmission and resumes the interrupted data transmission of the transmission buffer for the lower priority class logical channel.

In addition, in the case where data is accumulated in a transmission buffer for a logical channel whose priority class is lower than the priority class of the logical channel over which data is being transmitted, after the transmission buffer for the current priority class logical channel over which data is being transferred is emptied, the terminal 10 transmits an SR in order to request a radio resource for data transmission over the lower priority class logical channel. In the case of a lower priority class, data transfer that is being conducted is not interrupted and, after the data transfer empties the transmission buffer, an SR is issued anew.

When the transmission buffer of every priority class is emptied, data transfer is stopped and SR transmission is not executed until data is accumulated in the transmission data buffer 14 next time.

Figure 8:
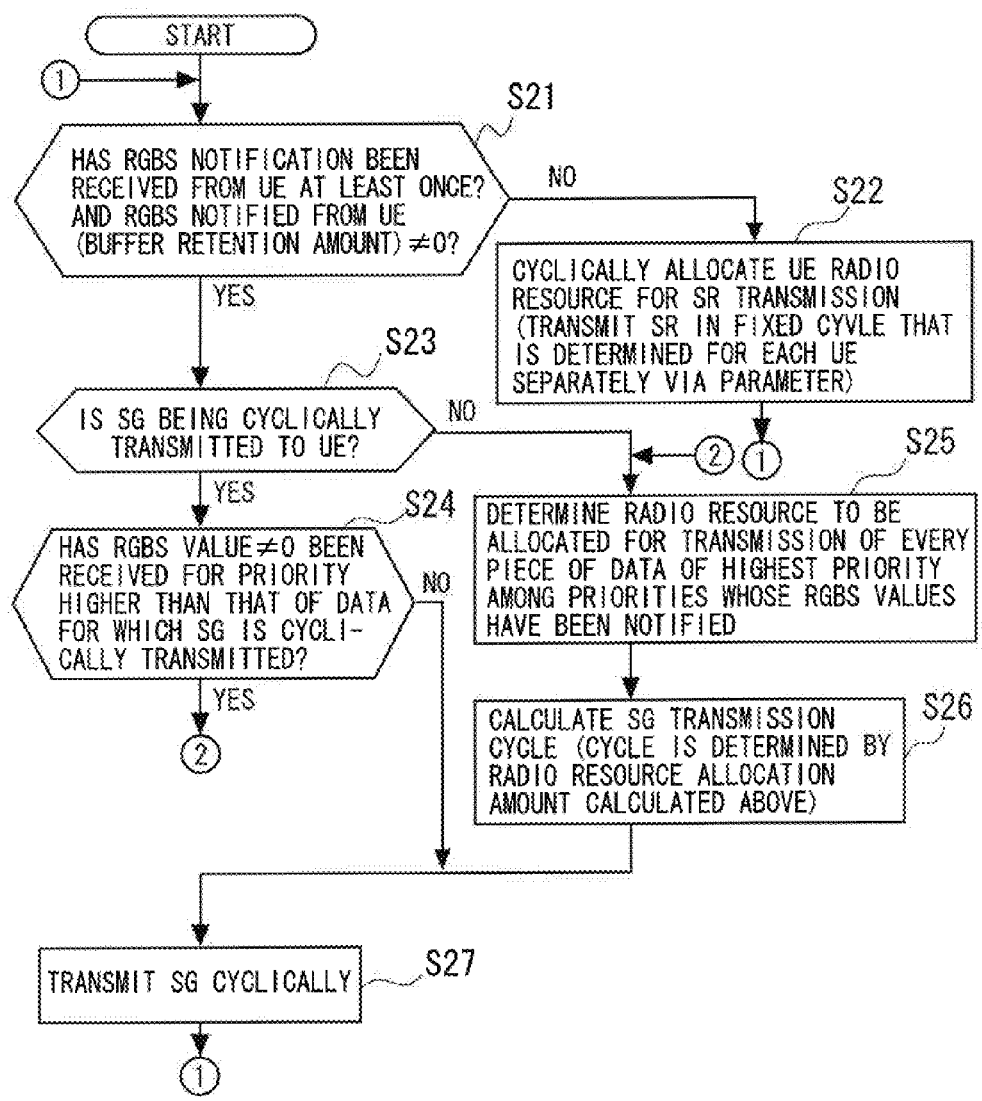
FIG. 8 is a flow chart illustrating an example of processing on the base station side in the first embodiment.

FIG. 8 is a flow chart illustrating an example of processing on the side of the base station 20 in the first embodiment. In FIG. 8, the base station 20 determines whether or not a condition that RGBS notification from the terminal 10 has been received at least once and the RGBS value is not zero is satisfied (S21).

In the case where the condition of S21 is not satisfied (No in S21), the base station 20 cyclically allocates the terminal 10 a radio resource for SR transmission (S22). The processing then returns to S21.

In the case where the condition of S21 is satisfied (Yes in S21), the base station 20 determines whether or not cyclic SG transmission to the terminal 10 is being conducted (S23). At this time, when the cyclic SG transmission is being conducted (Yes in S23), the base station 20 determines whether or not the RGBS value (not zero) of a priority class higher than the priority class for which the cyclic SG transmission is being conducted (S24).

In the case where the RGBS value of a higher priority class has not been received (No in S24), the base station 20 starts or continues cyclic SG transmission (S27). The processing then returns to S21.

In the case where cyclic SG transmission to the terminal 10 is not being conducted (No in S23) or the RGBS value of a higher priority class has been received (Yes in S24), on the other hand, the base station 20 determines radio resource allocation that allows for the transmission of every piece of data of the highest priority class among priority classes whose RGBS values have been notified (S25).

The base station 20 then calculates an SG transmission cycle suited to such radio resource allocation (S26). Thereafter, the processing proceeds to S27.

According to the processing illustrated in FIG. 8, the following processing is executed in the base station 20. That is, a buffer retention amount notification transmitted from the terminal 10 is checked and, for the terminal 10 in which the buffer retention amount is zero, an uplink radio resource for SR transmission is allocated regularly.

In the case where an SR is received once from one terminal and the buffer retention amount≠0, uplink radio resource allocation for SR transmission is stopped for this terminal until the buffer retention amount notified from this terminal becomes zero, and at the same time a radio resource for data transmission is allocated and an SG is cyclically transmitted to this terminal 10.

When the buffer retention amount notified from this terminal 10 becomes zero, the SG transmission is stopped and an uplink radio resource for SR transmission is cyclically allocated to this terminal 10. If it is found from the buffer retention amount notified on a priority class basis from the terminal 10 that data is retention in a transmission buffer for a logical channel whose priority class is higher than the priority class of the buffer from which data is currently being transferred, a radio resource for SR transmission is allocated to this terminal 10.

The SR radio resource allocation is cyclically repeated until an SR is received from this terminal. After the SR is received and an SG is issued for data transmission over the higher priority class logical channel, the allocation of a radio resource for SR transmission is stopped.

In the case where data is held in a transmission buffer for a logical channel whose priority class is lower than the priority class of the logical channel over which data is being transferred, the data transfer is continued until the current priority class transmission buffer from which data is being transferred at present is emptied. In other words, a radio resource for an SR is not allocated and the cyclic SG transmission is continued. When the buffer is emptied subsequently, the cyclic SG transmission is stopped and a radio resource for SR transmission is cyclically allocated.

When an SR requesting a radio resource for data transmission over the lower priority class logical channel is received from the terminal 10, the cyclic SR radio resource allocation is stopped, a radio resource to be allocated for the data transmission and an SG transmission cycle are determined, and cyclic SG transmission is started. When the buffer retention amount of every priority class notified from this terminal 10 becomes zero, the cyclic SG transmission is stopped and the base station 20 returns to cyclic allocation for an SR again.

Note that the SG transmission cycle determined for this terminal may be set uniformly to every terminal that is under the control of the base station. Alternatively, by checking the capability (data transfer rate) of the terminal when the terminal connects with the base station 20, different SG transmission cycles may be determined for different terminals according to the terminal's capability.

Alternatively, immediately before cyclic SG transmission is started, the adaptively changing data transmission capability of the terminal, such as an adaptive modulation method and TBS (Transport Block Size) that are currently employed by this terminal is checked, in order to determine an SG transmission cycle that allows the terminal to transmit all of its data at the current communication rate.

The base station side in this case may employ a method in which the base station 20 has a table for determining an SG transmission cycle with the terminal's data transmission rate, which is calculated from the type of the adaptive modulation method and the TBS, as an argument, and calculates the SG transmission cycle by searching this table. Alternatively, the SG transmission cycle may also be calculated by an SG transmission cycle calculation formula (a calculation formula such as [UE data communication rate index (for example, a number indicating the adaptive modulation method or the TBS size)/constant (a parameter setting or fixed value)=SG transmission cycle]).

According to the first embodiment, an SG and an SG transmission cycle that are suited to the transmission buffer retention amount of the terminal are determined and, while the determined SG is cyclically transmitted in the determined SG transmission cycle, the allocation of a radio resource for SR transmission is stopped. Accordingly, unnecessary SR transmission (the amount of radio resource allocated for SR transmission) may be reduced without affecting data transfer between the terminal and the base station. As a result, the utilization efficiency of uplink radio resources is enhanced and a larger amount of information for improving the communication quality, such as a CQI, may be transferred from the terminal to the base station. The communication quality is consequently improved. In addition, interference from SR transmission to other terminals is suppressed.

Further, according to the first embodiment, in the case where a priority class is set to each of a plurality of logical channels and a plurality of transmission buffers are provided for the respective priority classes, data transfer in which the priority classes is taken into consideration may be executed while unnecessary allocation of a radio resource for SR transmission is eliminated.

<Second Embodiment>

A second embodiment is described next. The second embodiment and the first embodiment have some points in common. Therefore, descriptions on the common points are omitted and differences are described mainly.

The second embodiment describes a second method in which the SR transmission cycle alone is controlled terminal by terminal, without stopping SR transmission during data transfer as in the first embodiment. In the second method, the data transmission buffer retention amount of each terminal which is notified to the base station is used to set the SR transmission cycle long when the buffer retention amount is large, and to set the SR transmission cycle shorter as the retention amount decreases.

As described in the first embodiment, when the terminal receives data while the transmission buffer of every logical channel is empty, or when data is held in the transmission buffer of a priority class different from the priority class of the logical channel over which data is being transferred, the terminal transmits an SR for requesting the base station for a radio resource to transfer the newly held data.

In addition to the above, because of the limit of data transfer rate of the terminal and the limit of buffer amount (buffer size), it is not much likely under circumstances where the buffer retention amount in the terminal is large that the terminal will transmit an SR requesting an additional radio resource for the transfer of more data. When the buffer retention amount is small, on the other hand, the possibility of the terminal transmitting an additional SR is high.

Further, when the buffer retention amount is large, data transmission is focused on data transfer that has been already being executed. The terminal therefore does not need to hurry in transmitting an SR, unless data is newly held in a transmission buffer for a logical channel whose priority class is higher than the priority class of the data that is being transferred. Accordingly, no problem arises from setting a long SR transmission cycle to a terminal that has a large buffer retention amount and controlling the terminal less finely.

This is reversed for a terminal that has a small buffer retention amount, and the terminal is given a short SR transmission cycle and controlled finely in order to reduce data transfer delay when data is newly held in association with a logical channel over which data is not being transferred. Further, it is likely in a terminal having a small buffer retention amount that a transmission buffer for a logical channel of a high priority class is empty, and the terminal is given a short SR transmission cycle and controlled finely in order to deal promptly with a case in which data are newly held in the high priority class transmission buffer.

By controlling the SR transmission cycle optimally for each terminal based on the buffer retention amount of each terminal in this manner, unnecessary uplink radio resource allocation for SR transmission is reduced and the communication quality is improved.

For terminal and base station that may be employed for the second embodiment, the configurations of the terminal 10 and the base station 20 (FIG. 3A, FIG. 3B) described in the first embodiment may be employed. For methods in which on the base station 20 side, the transmission buffer retention amount of each terminal 10 is taken into consideration, Control Examples 1 to 3 as described below is given.

(Control Example 1) SR transmission cycle control that takes into consideration only the buffer retention amount of high priority classes A threshold for priority classes whose buffer retention amount is taken into consideration is provided as a parameter setting value to a plurality of priority classes, and is set on the side of the base station 20. The base station 20 obtains for each terminal the sum of the buffer retention amounts of logical channels whose priority classes are higher than the priority class threshold.

From the calculated sum value, the base station 20 obtains an SR transmission cycle for each terminal by searching an SR transmission cycle table as the one illustrated in FIG. 9, and applies the SR transmission cycles to the respective terminals. Respective values in the table of FIG. 9 represent the following.

Xmeas: The sum value of buffer retention amounts of Priorities higher than a threshold a1, a2, ..., an−1, an: A threshold for selecting an SR transmission cycle suited to the sum buffer retention amount value A1, A2, ..., An−1, An: An SR transmission cycle [ms]

The values in the table of FIG. 9 are preferably variable via parameter settings. This is because it is desirable that the values may be adjusted to suit the count of terminals processed by the base station, or the terminal type.

The sum values illustrated in FIG. 9 are merely examples, and the same value may be used for the upper limit value of one sum value and the lower limit value of the next sum value, for example, in a1≤Xmeas≤a2, a2≤Xmeas≤a3. In other words, sum value ranges may be defined such that one sum value range is continuous.

Note that in order to obtain the SR transmission cycle from the sum buffer retention amount value, a calculation formula as the following Expression 1 may be used.

$$T\_SR = \text{bufSum\_th} / \text{Xpara} \quad \text{(Expression 1)}$$

where "T_SR" represents the SR transmission cycle [ms], "bufSum_th" represents the sum value [byte] of the buffer retention amounts of priority classes higher than a threshold in the terminal, and "Xpara" represents a parameter setting fixed value.

Figure 10:
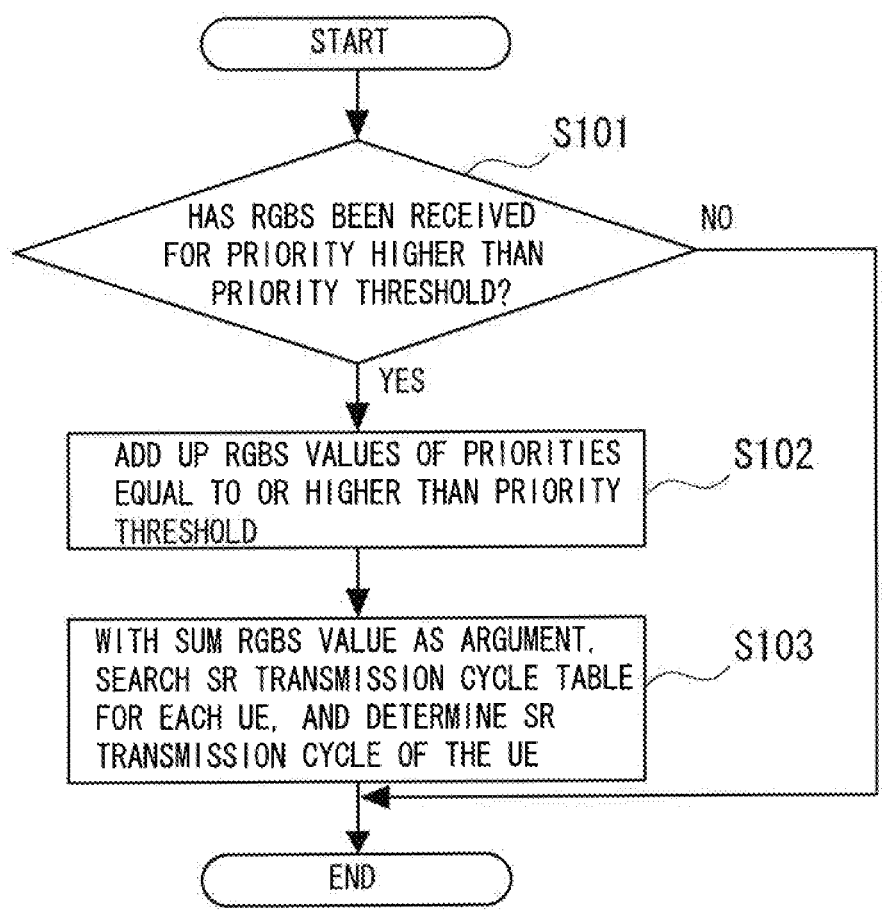
FIG. 10 is a flow chart illustrating a processing example according to Control Example 1 in a second embodiment.

FIG. 10 is a flow chart illustrating a processing example according to Control Example 1. First, whether or not the RGBS of data of a priority class higher than the priority class threshold has been received is determined (S101).

In the case where the RGBS of data of a priority class higher than the priority class threshold has been received (Yes in S101), the RGBS values of priority classes higher than the priority class threshold are added up for each UE (S102).

With each sum RGBS value as an argument, a search of the SR transmission cycle table (FIG. 9) is subsequently conducted for each terminal to determine an SR transmission cycle that fits the terminal (S103).

The SR transmission cycle table illustrated in FIG. 9 may be held in, for example, the SR/SG controller 31 illustrated in FIG. 3B, so that the SR/SG controller 31 executes the processing illustrated in FIG. 10. The SR/SG controller 31 may have a recording area for holding the buffer retention amount (RGBS value) of each priority class for each terminal. The SR/SG controller 31 determines an SR transmission cycle with which an update is made, and notifies the SR transmission cycle to the scheduler 27 to instruct an update of the SR transmission cycle.

Figure 11:
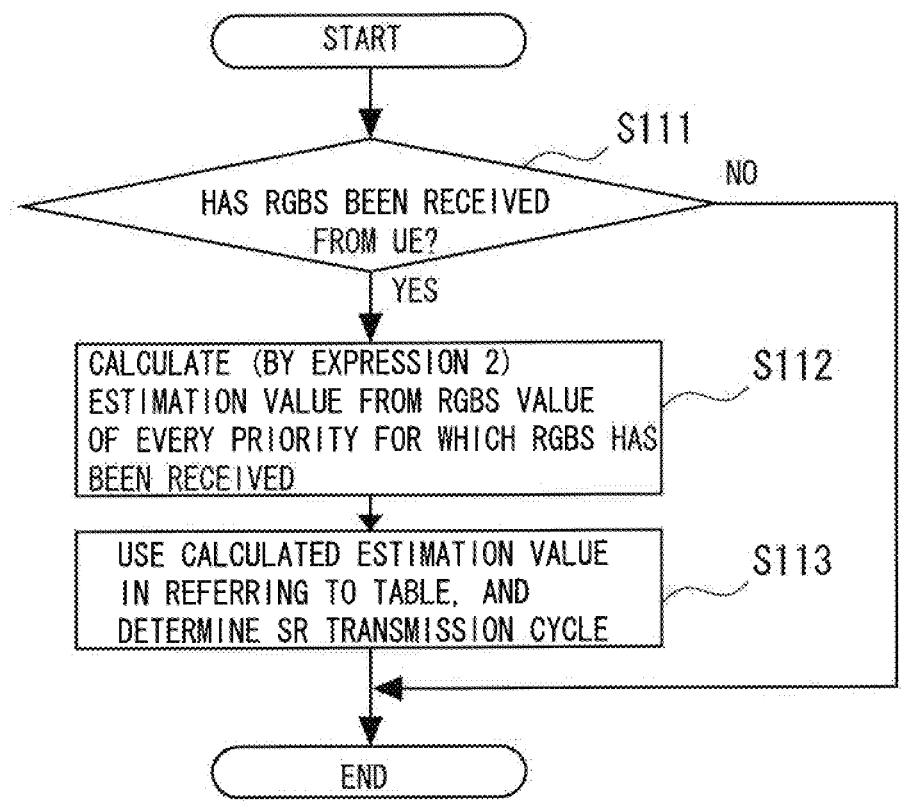
FIG. 11 is a flow chart illustrating a processing example according to Control Example 2 in the second embodiment.

(Control Example 2) An example of controlling the SR transmission cycle of each terminal based on a coefficient which is calculated on a terminal basis by weighting the buffer retention amount of each priority class FIG. 11 is a flow chart illustrating a processing example of Control Example 2. In FIG. 11, the base station 20 first determines whether or not the RGBS has been received from the terminal 10 (S111). In the case where the RGBS has been received, an estimation value is calculated from the RGBS values of all priority classes of the terminal from which the RGBS has been received. As a calculation formula of the estimation value, the following Expression 2 is used:

$$\text{BufSum\_CalcVal} = P_{1\,val} \times Buf_{prio1} + P_{2\,val} \times Buf_{prio2} + \quad \text{(Expression 2)}$$
$$P_{3\,val} \times Buf_{prio3} + P_{4\,val} \times Buf_{prio4} + P_{5\,val} \times Buf_{prio5} +$$
$$P_{6\,val} \times Buf_{prio6} + P_{7\,val} \times Buf_{prio7} + P_{8\,val} \times Buf_{prio8}$$

The premise of Expression 2 is that the total priority class count is 8. In Expression 2, "BufSum_CalcVal" represents an estimation value of the buffer retention amounts that takes priority class into consideration, "$P_{1\,val}$ to $P_{8\,val}$" represent weighting coefficients (parameter setting values) of the respective priority classes, and "$Buf_{prio1}$ to $Buf_{prio8}$" represent the buffer retention amount values reported from the terminal.

After the estimation value is calculated, the SR transmission cycle table (FIG. 9) is referred to with the estimation value as an argument, and an SR transmission cycle that fits the terminal is determined (S113). This processing is executed for each terminal separately.

In the processing illustrated in FIG. 11, the order of transmitting data varies depending on priority class and the terminal-basis buffer retention amount is therefore estimated by taking priority class into consideration. An estimation value calculated by Expression 2 is used to obtain the SR transmission cycle of each terminal from an SR transmission cycle table as the one illustrated in FIG. 9. The base station 20 allocates each terminal an uplink radio resource for SR transmission in the SR transmission cycle obtained for the terminal.

The SR transmission cycle is changed each time the base station 20 receives the buffer retention amount (RGBS) from one terminal, and the updated SR transmission cycle may be notified to this terminal through an SG. The processing of FIG. 11 according to Control Example 2 may be executed by the SR/SG controller 31 as in Control Example 1.

In Control Example 2, the SR transmission cycle is switched dynamically. It is therefore desirable to take a propagation delay between the base station 20 and the terminal 10 into consideration. The SR transmission cycle may be switched by the following two methods.

(Method 1) The application of an updated SR transmission cycle is started at a time point (1 subframe+propagation delay) calculated by adding a base station-terminal propagation delay to a subframe that follows a time point at which the base station 20 has received an SR from the terminal 10 and issued an SG. The terminal 10 starts employing the new SR transmission cycle in a subframe that follows the reception of the SG. The applied SR transmission cycle is set as a cycle having a subframe that follows the SG reception as the reference.

In other words, the base station 20 takes into consideration a delay in propagation between the base station 20 and the terminal 10 and uses, as quality information that is used in referring to the SR transmission cycle table, past quality information (quality measurement value) for a length of time corresponding to the propagation delay.

Figure 12:
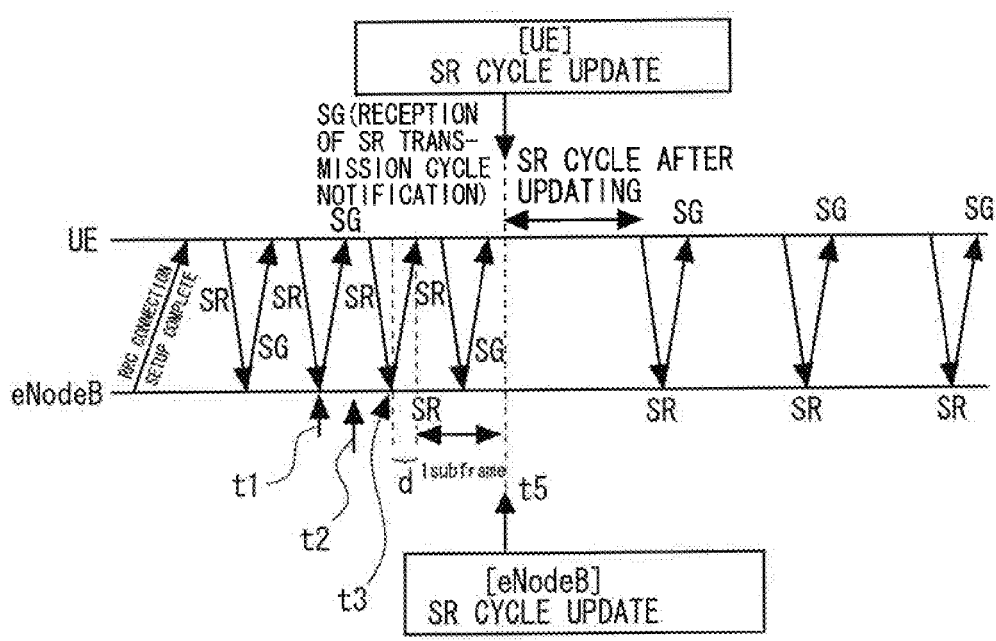
FIG. 12 is a diagram illustrating an example of dynamically updating the SR transmission cycle (Method 1)

FIG. 12 illustrates an example of dynamically updating the SR transmission cycle. As illustrated in FIG. 12, when processing of connecting the base station and the terminal is completed to establish a synchronized state (RRC CONNECTION SETUP COMPLETE), uplink control channel radio resources are allocated such that cyclic SR transmission and SG return are executed. Thereafter, in the case where the RGBS is received along with an SR that is received at a time point t1 of FIG. 12, for example, the base station 20 calculates through the processing illustrated in FIG. Han SR transmission cycle with which an update is made (time point t2). However, the SR transmission cycle is not changed at this point. When the next SR is subsequently received (time point t3), the base station uses an SG that is issued in response to this next SR to notify the terminal 10 of the SR transmission cycle with which an update is made.

The base station 20 at the same time waits for a terminal-base station propagation delay d and one subframe to pass since the time point t3 (waits for a time point t5 to arrive). At the time point t5, the base station 20 and the terminal 10 change the SR transmission cycle with which an update is made, and uplink radio resource that causes an SR and an SG to be transmitted/received in the updated SR transmission cycle is allocated through this terminal 10.

(Method 2) A cycle for changing the SR transmission cycle is defined as T2 [ms], and control over the changing of the SR transmission cycle is started when T1 [ms] (for example, T2>T1) passes since the RRC CONNECTED state (a state where the terminal and the base station are in synchronization with each other) is established. The control is executed while taking into consideration a delay in propagation between the base station and the terminal.

Figure 13:
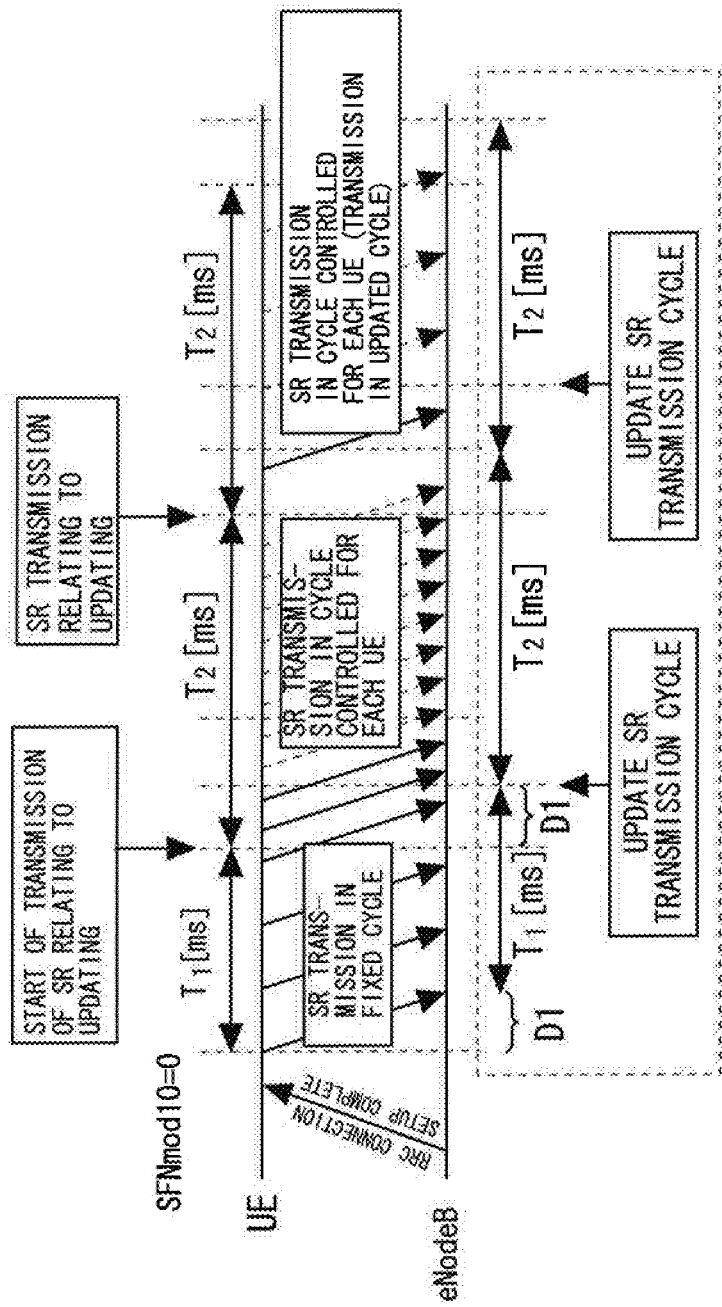
FIG. 13 is a diagram illustrating another example of dynamically updating the SR transmission cycle (Method 2)

FIG. 13 illustrates an example of dynamically updating the SR transmission cycle (Method 2). As illustrated in FIG. 13, when the given time period T1 elapses since the synchronized state of the terminal 10 and the base station 20 is established (RRC CONNECTION SETUP COMPLETE) and the first SR is transmitted, the base station 20 executes the allocation of a resource for SR transmission in order to enable the UE to change the SR transmission cycle and transmit an SR. From then on, whenever the time period T2 elapses, radio resource allocation is executed such that the SR transmission cycle is changed to one suited to the buffer retention amount.

An area in FIG. 13 that is enclosed by a dashed line illustrates an example in which the base station 20 takes into consideration a terminal-base station propagation delay D1. In this case, after the propagation delay D1 elapses with a time point at which the first SR is transmitted from the terminal 10 as the starting point, the count of the given time period T1 is started. Then, control over radio resource allocation for enabling the terminal to transmit an SR in an updated SR transmission cycle is executed after "T1+D1" elapses. Processing of updating the SR transmission cycle may be started upon the elapse of "T1+D1."

In Methods 1 and 2 described above, a propagation delay calculated from the maximum cell radius of the base station may be employed as the terminal-base station propagation delay. A value deduced from the path point of a signal that the base station receives from the terminal may be employed instead. In both of Methods 1 and 2, the control for updating the SR transmission cycle illustrated in FIG. 12 or FIG. 13 is executed on a millisecond basis. Therefore, even with the cell radius assumed to be 50 [km], the propagation delay is, at most, $50 \times 10^3 [m]/3.0 \times 10^8 = 16.666 \ldots \times 10^{-5} [s] \approx 166.7 [\mu s]$. This means that the control may be synchronized between the base station and the terminal in Methods 1 and 2 if the control of the terminal and the control of the base station are staggered on a subframe basis.

Figure 14:
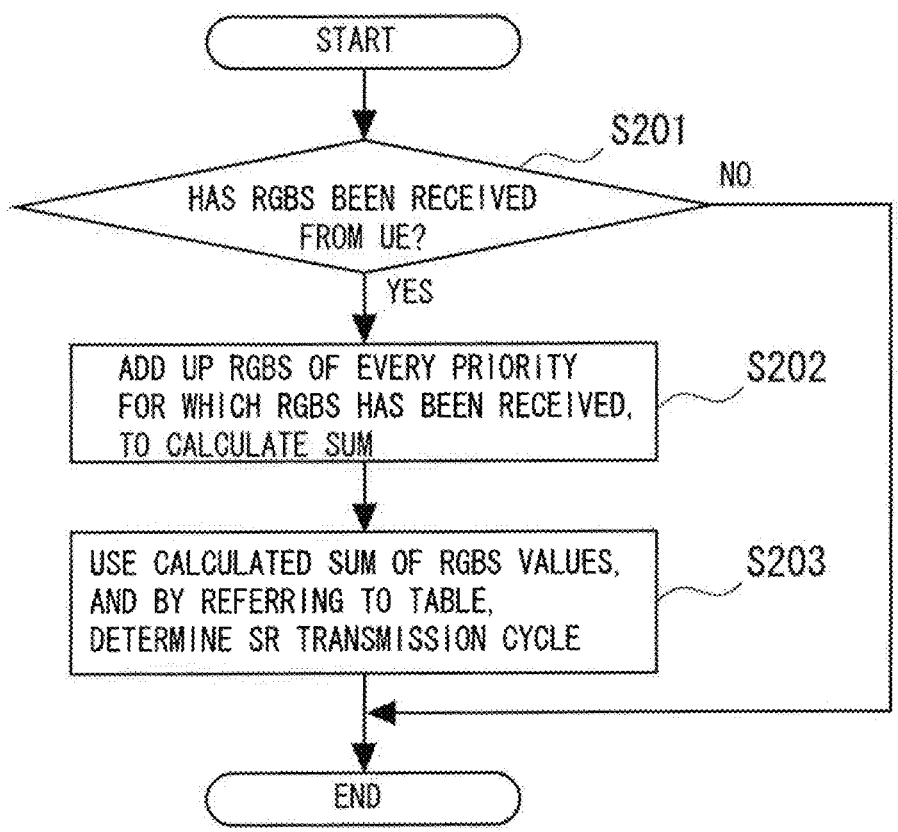
FIG. 14 is a flow chart illustrating an example of processing of the base station in the second embodiment.

(Control Example 3) An Example of controlling the SR transmission cycle with the use of the sum buffer retention amount value of each terminal FIG. 14 is a flow chart illustrating an example of processing that is executed when Control Example 3 is employed. As the processing of FIG. 14 is started, the base station 20 (for example, SR/SG controller 31) determines whether or not the RGBS has been received from the terminal 10 (S201).

In the case where the RGBS has been received, the base station 20 adds up the RGBS values of all priority classes of the terminal 10 that has transmitted the RGBS (S202). The base station 20 uses the sum RGBS value to search the SR transmission cycle table (FIG. 9) for an SR transmission cycle that is associated with the sum RGBS value, thereby determining an SR transmission cycle with which an update is made (S203).

In Control Example 3, the base station 20 adds up the respective buffer retention amounts of the priority classes for each terminal separately, and controls the SR transmission cycle (allocation of a radio resource for SR transmission) of each terminal with the use of the terminal's total amount of data to be transmitted. The respective buffer retention amounts of the priority classes are notified from each terminal 10 to the base station 20. The base station 20 therefore calculates the sum of the buffer retention amounts of the priority classes for each terminal separately, sets a long SR transmission cycle to a terminal that has a large retention amount, and sets a short SR transmission cycle to a terminal that has a small retention amount.

One of the methods described in Control Example 1 and Control Example 2 may be applied to the determination of an SR transmission cycle. The methods described in Control Example 2 may be employed to change an SR transmission cycle that is in operation. Control Example 1, where a table search is executed instead of actual calculation, may be carried out with a small processing amount.

According to the second embodiment also, unnecessary radio resource allocation for SR transmission is reduced and the utilization efficiency of control-use radio resources is thus improved, which leads to an improvement in communication quality.

<Third Embodiment>

A third embodiment is described next. The third embodiment and the first embodiment have some points in common. Therefore, descriptions on the common points are omitted and differences are described mainly. The third embodiment describes a method in which the current buffer retention amount and the preceding buffer retention amount are compared for each terminal, and the SR transmission cycle is shortened for a terminal that has a large differential in retention amount.

The third embodiment, too, may employ the configurations of the terminal 10 and the base station 20 that are described in the first embodiment. Processing described in the third embodiment may be executed by, for example, the SR/SG controller 31. The SR/SG controller 31 may be omitted also from the third embodiment.

Figure 15:
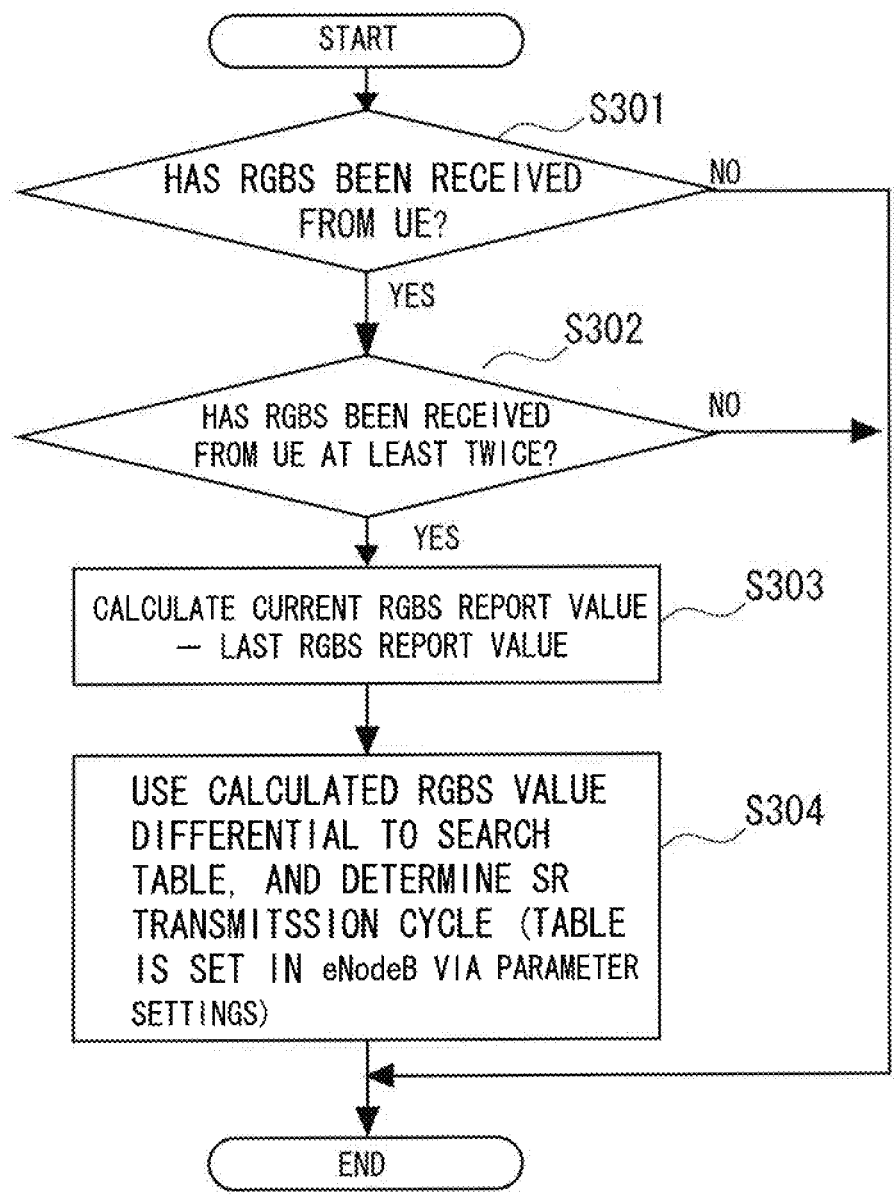
FIG. 15 is a flow chart illustrating an example of processing of the base station in a third embodiment.

FIG. 15 is a flow chart illustrating an example of processing of the base station in the third embodiment. In the processing of FIG. 15, the base station 20 determines in 5301 whether or not the RGBS has been received from the terminal 10. In the case where the RGBS has been received, the base station waits for the reception of the next RGBS (S302). When the next RGBS is received, the base station 20 calculates the differential between the current RGBS and the last RGBS (S303). Obtaining the differential, the base station 20 retrieves an SR transmission cycle associated with the differential from an SR transmission cycle table, which is prepared in advance, and determines the retrieved SR transmission cycle as an SR transmission cycle with which an update is made (S304). Thereafter, the uplink radio resource (control channel) allocation status is updated such that an SR is transmitted in the updated SR transmission cycle.

A large differential between the current buffer retention amount (current RGBS value) and the buffer retention amount notified in one communication session before (last RGBS value) indicates that data arrives at the transmission data buffer 14 of the terminal at a fast rate. In such a terminal, the situation changes frequently in relation to the data transfer amount. Further, retention data in a transmission buffer is transferred in a short period of time. It is therefore preferable to finely control uplink radio resource allocation for data transmission. The situation described above is reversed for a terminal that has a small differential in buffer retention amount, and a long SR transmission cycle may be set to such a terminal.

The SR transmission cycle may be updated while the base station 20 is in operation, by one of the methods described as Control Example 2 of the second embodiment. In calculating an SR transmission cycle for each terminal from the differential between the current buffer retention amount and the last buffer retention amount, the base station 20 may employ one of the methods described with regard to Control Example 1 of the second embodiment: the method of searching an SR transmission cycle table prepared in advance; and the method of calculating an SR transmission cycle using a given calculation formula.

The buffer retention amount differential may be calculated by one of the following methods:
<1> The differential is obtained for each terminal and for each priority class;
<2> Only the buffer retention amount differentials of high priority classes (priority classes that are higher than a priority class threshold) are used to determine an SR transmission cycle for each terminal; and
<3> The buffer retention amount differential of every priority class is calculated for each terminal, the calculated a plurality of differential values are weighted and added to obtain an estimation value by a calculation formula as the one described in Control Example 2 of the second embodiment (Expression 2), and an SR transmission cycle is determined based on the estimation value.

Whichever of the methods described above is employed, table values for calculating an SR transmission cycle, and values used (substituted) in the calculation formula such as weights and coefficients are desirably parameter settings, so that these values may be changed to suit the installation condition of the base station 20.

According to the third embodiment also, unnecessary radio resource allocation for SR transmission is reduced and the utilization efficiency of control-use radio resources is thus improved, which leads to an improvement in communication quality.

<Fourth Embodiment>

A fourth embodiment is described next. The fourth embodiment and the first embodiment have some points in common. Therefore, descriptions on the common points are omitted and differences are described mainly.

The fourth embodiment describes a method in which an average data rate (average transfer rate) calculated in the base station for each terminal is used to predict the degree of increase/decrease in buffer retention amount for each terminal, and the SR transmission cycle is controlled such that a short SR transmission cycle is set to a terminal predicted to experience a large increase/decrease in buffer retention amount, whereas a long SR transmission cycle is set to a terminal predicated to experience a small increase/decrease in buffer retention amount.

When allocating an uplink terminal an uplink radio resource, the base station knows the uplink transfer rate of the terminal (for example, the payload size and what modulation method is employed), and may therefore calculate from the count of subframes in which data has been received from this terminal and the count of ACK messages (reception acknowledgement messages) returned through HARQs (retransmission control).

Figure 16:
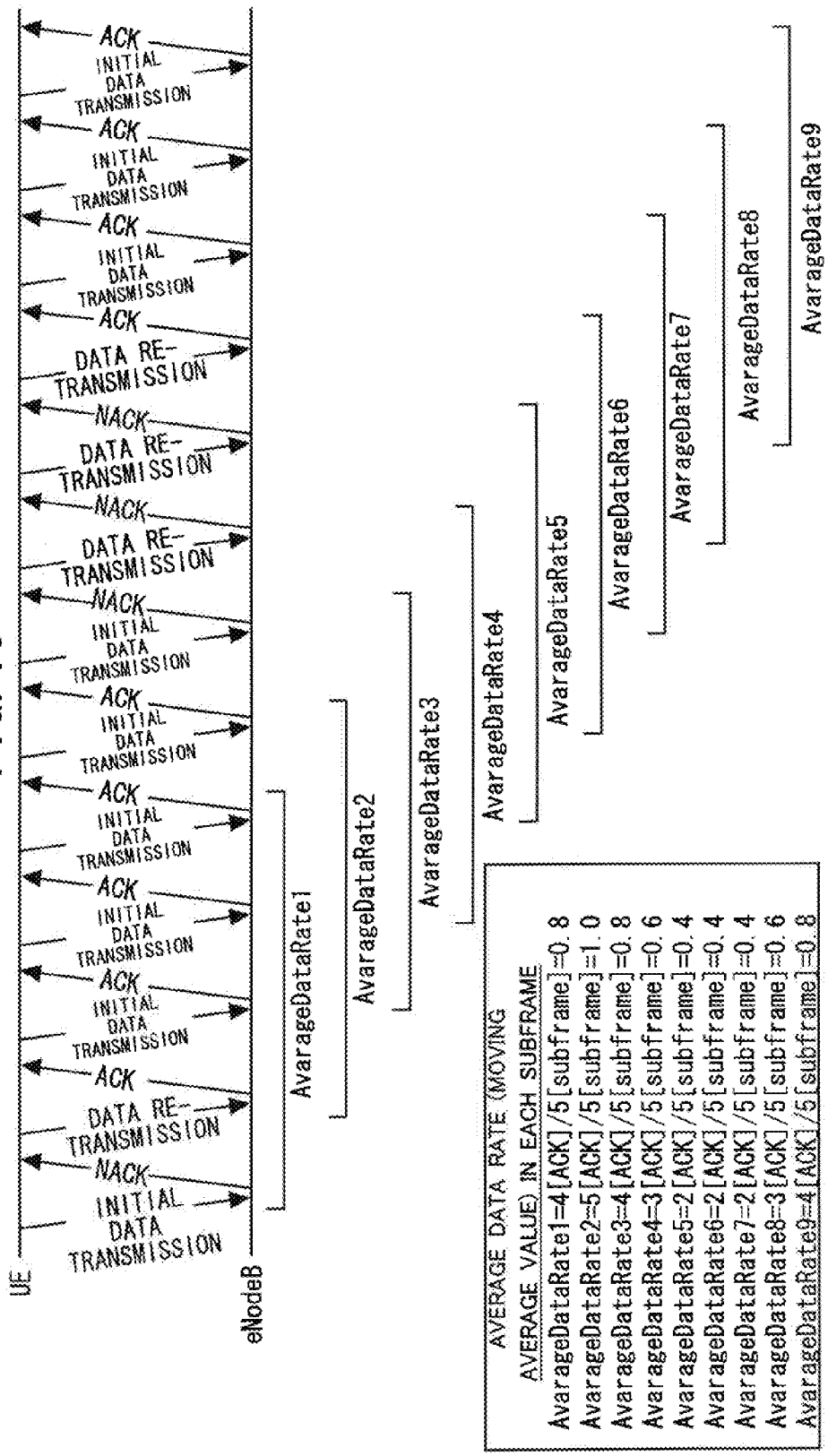
FIG. 16 is a diagram illustrating an example of how an average data rate is calculated.

There are a plurality of average data rate calculation methods, and an example thereof is given here. FIG. 16 is a diagram visualizing average data rate calculation. For each subframe zone of given size (=five subframes in FIG. 15), an average data rate (moving average) is calculated and an update of the average data rate is executed one subframe at a time. In other words, an average data rate (moving average) is calculated by dividing the count of ACK messages that are returned through HARQ retransmission control within a subframe zone for which the moving average is to be calculated, by the count of subframes contained in the subframe zone. For example, four ACK messages are returned in the first subframe zone (five subframes). The average data rate of this subframe zone is accordingly 0.8. Subsequently, an update of the average data rate is executed one subframe at a time.

A high average data rate means that the data transfer rate is high and that retention data in a transmission buffer of the terminal is transferred in a short period of time. In such a terminal, the probability of an SR being transmitted is high and a transmission buffer is emptied fast as well. The SR transmission cycle of the terminal is therefore set short so that uplink radio resource allocation is controlled finely. To a terminal having a low average data rate, a long SR transmission cycle is set from the opposite reason from the one stated above.

In the method of determining an SR transmission cycle from the average data rate, an association table associating an average data rate and an SR transmission cycle is stored in a storage device of the base station in advance, the calculated average data rate is used in referring to the association table to thereby obtain its associated SR transmission cycle, and applying this SR transmission cycle is determined. Alternatively, a calculation formula for calculating an SR transmission cycle from the average data rate may be prepared, and an SR transmission cycle is calculated by the calculation formula.

The SR transmission cycle is changed in, for example, a given cycle T [ms]. In each cycle T, the base station calculates a change in SR transmission radio resource allocation for each terminal with the use of the average data rate, and notifies the terminals of their respective updated SR transmission cycles before the next cycle is started. The base station also allocates each terminal an uplink radio resource so that the terminal may transmit an SR in the updated SR transmission cycle in the next cycle. From the next cycle on, the terminals may transmit an SR in their respective updated SR transmission cycles. The length of the cycle T may be determined arbitrarily as long as the length of the cycle T is longer than the length of the subframe zone set for average data rate calculation. The cycle T may also have a variable length.

Figure 17:
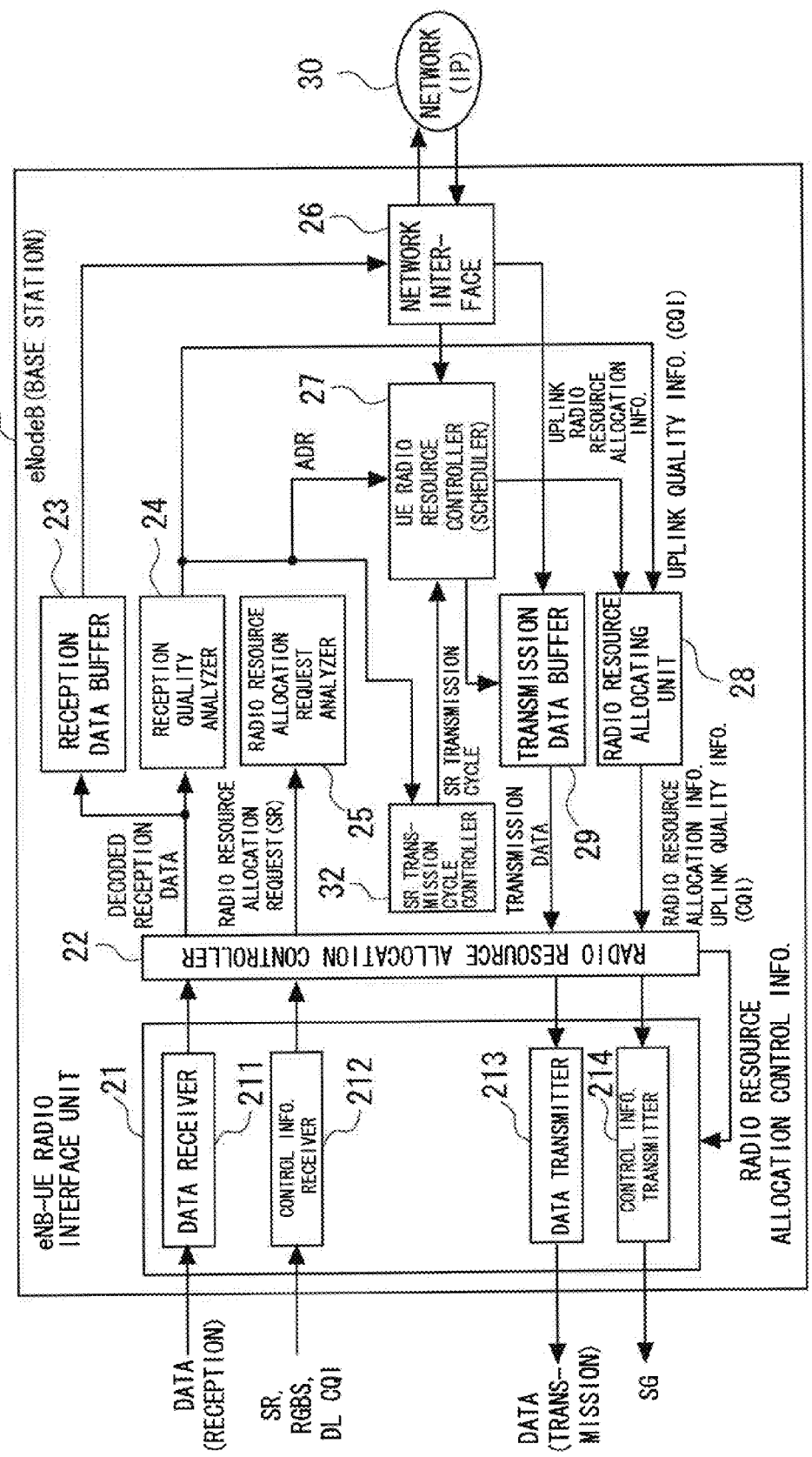
FIG. 17 is a diagram illustrating a configuration example of a base station according to a fourth embodiment.
Figure 18:
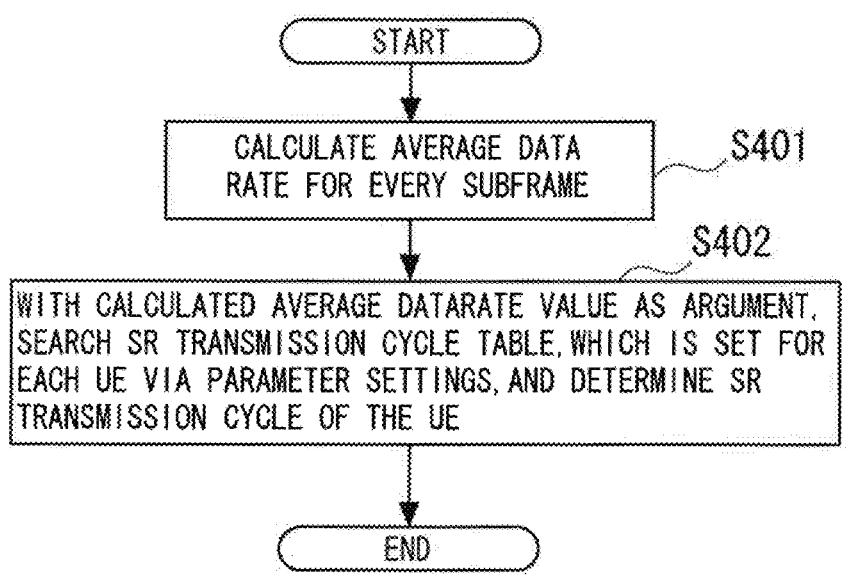
FIG. 18 is a flow chart illustrating an example of processing of the base station in the fourth embodiment.

FIG. 17 illustrates a block configuration example of the base station in the fourth embodiment. FIG. 18 is a flow chart illustrating an example of processing according to the fourth embodiment. A base station 20A illustrated in FIG. 17 has substantially the same configuration as the base station 20 illustrated in FIG. 3B. However, the base station 20A differs from the base station 20 in the following points.

An average data rate is calculated in the reception quality analyzer 24 from a moving average obtained by counting the ACK/NACK count in HARQs (FIG. 18: S401). The average data rate is notified to an SR transmission cycle controller 32.

The SR transmission cycle controller 32 has an association table in which an average data rate and an SR transmission cycle are registered in association with each other. Receiving an average data rate, the SR transmission cycle controller 32 retrieves its associated SR transmission cycle from the association table, and determines the retrieved SR transmission cycle as an SR transmission cycle with which an update is made (FIG. 18: S402).

The determined SR transmission cycle is notified from the SR transmission cycle controller 32 to the scheduler 27, and the current SR transmission cycle is changed. In other words, the scheduler 27 issues an instruction to transmit an SR in the determined SR transmission cycle.

In this manner, the SR transmission cycle is made variable and radio resource allocation suited to the SR transmission cycle is executed in the fourth embodiment, too. Control-use radio resources are thus utilized efficiently and the communication quality is improved.

According to the first to fourth embodiments, the SR transmission cycle, which, in prior art, is uniformly determined on a terminal basis, is controlled for each terminal to have a cycle that is necessary and optimum. This eliminates unnecessary SR transmission and accordingly increases the amount of CQI information transmitted from the terminal to the base station, thereby improving the resolving power of control for ensuring the quality. Further, interference by unnecessary SR transmission is reduced, with the result that a higher count of terminals that may be connected concurrently to the base station and improved communication quality may be expected.

In the embodiments described above, the buffer retention amount (RGBS) is transferred with the use of PUCCH1. The buffer retention amount may instead be transferred via MAC layer control information (MAC control element).

<Fifth Embodiment>

A fifth embodiment is described next. In the first to fourth embodiments described above, the buffer retention amount of a terminal is notified to the base station by the reception of the buffer retention amount (RGBS) in the base station which has been transmitted from the terminal over PUCCH1. The fifth embodiment describes an example in which the buffer retention amount is notified by a media access control (MAC) layer with the use of a MAC control element.

The MAC control element is a specification added in Long Term Evolution (LTE), and is described in "6.1.3 MAC control element" of TS 36.321.

The MAC control element is control information terminated by the MAC layer, and is attached to the head of a MAC protocol data unit (MAC PDU) to be used in the exchange of MAC layer control information between a base station (eNode B) and a terminal device (UE) (eNode B to UE, and UE to eNode B).

Figure 19:
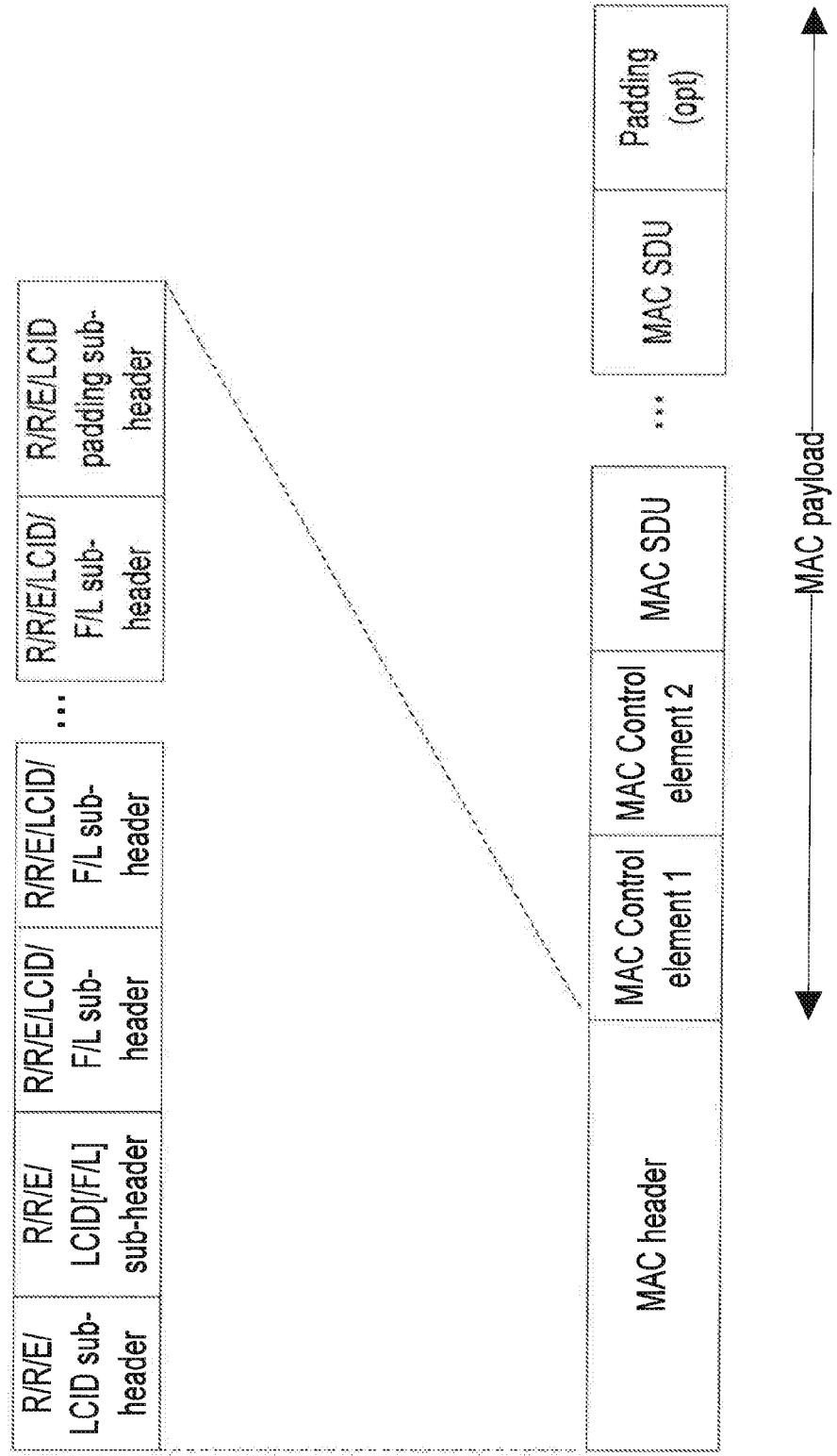
FIG. 19 is an explanatory diagram of a MAC frame (a MAC PDU and a MAC control element) employed in a fifth embodiment.

FIG. 19 is an explanatory diagram of the MAC PDU and the MAC control element. As illustrated in FIG. 19, a MAC frame includes a MAC header and a MAC payload (MAC PDU), and the MAC payload includes a MAC control element, a MAC SDU, and padding (option). The MAC control element is mapped to the head of the MAC payload.

In the uplink (UL: terminal device to base station), information transmitted over a PUSCH is given to the MAC SDU on a logical channel basis as illustrated in FIG. 19. In other words, information of one logical channel is stored in one MAC SDU. The MAC control element is prepared as control information of a MAC layer separately from the MAC SDU. The presence or absence of a MAC control element in the MAC payload is indicated within the MAC header.

In a MAC control element, the following control information is exchanged between the terminal device and the base station.

Buffer status report (BSR): Buffer retention amount.

C-RNTI: A number for identifying the UE (terminal device). The C-RNTI is set by assigning a number when the UE is set on the eNB side.

Power headroom (PH): The PH indicates the UE's surplus transmission power. A larger PH value means a higher level of power to which the UE may rise up.

Other control information includes those called "Timing Advance," "DRX Command," and "UE Contention Resolution ID."

Figure 20:
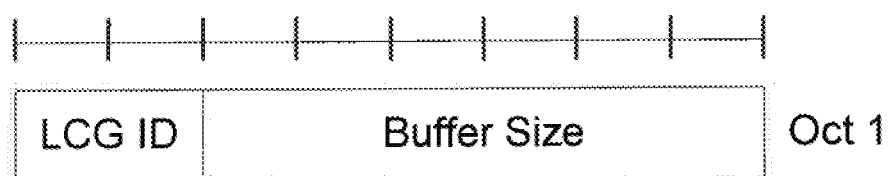
FIG. 20 is an explanatory diagram of a short buffer status report (SBSR)
Figure 21:
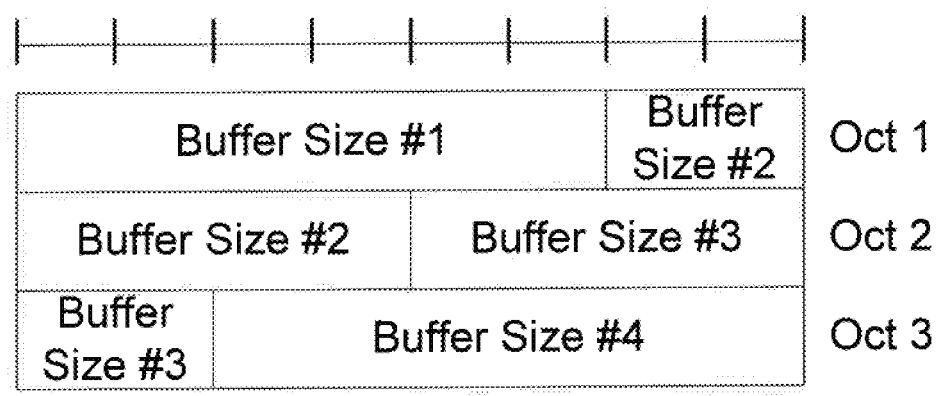
FIG. 21 is an explanatory diagram of a long buffer status report (LBSR)

FIG. 20 is an explanatory diagram of a Short Buffer Status Report (SBSR), and FIG. 21 is an explanatory diagram of a Long Buffer Status Report (LBSR). The SBSR is used to notify the buffer retention amount of only one logical channel group (LCG) of the UE. An LCG ID to be notified is therefore attached to the SBSR. With the LBSR, the buffer retention amounts of all LCGs of the UE are notified.

The LCG refers to a plurality of groups of logical channels (LCHs) divided as specified by an RRC layer, and one LCG contains a plurality of LCHs. The buffer retention amount is managed on an LCG basis and buffer scheduling is executed for each LCG separately. However, on the data level, an individual logical channel is set to each LCH.

In 3GPP, it is defined that four LCGs should be provided for one UE. It is also defined that eight LCHs at maximum should be provided for one UE.

As has been described, the fifth embodiment transfers the buffer retention amount over a PUSCH, which is a user channel, unlike the first to fourth embodiments where a PUCCH1, which is a control channel, is used.

Figure 22A:
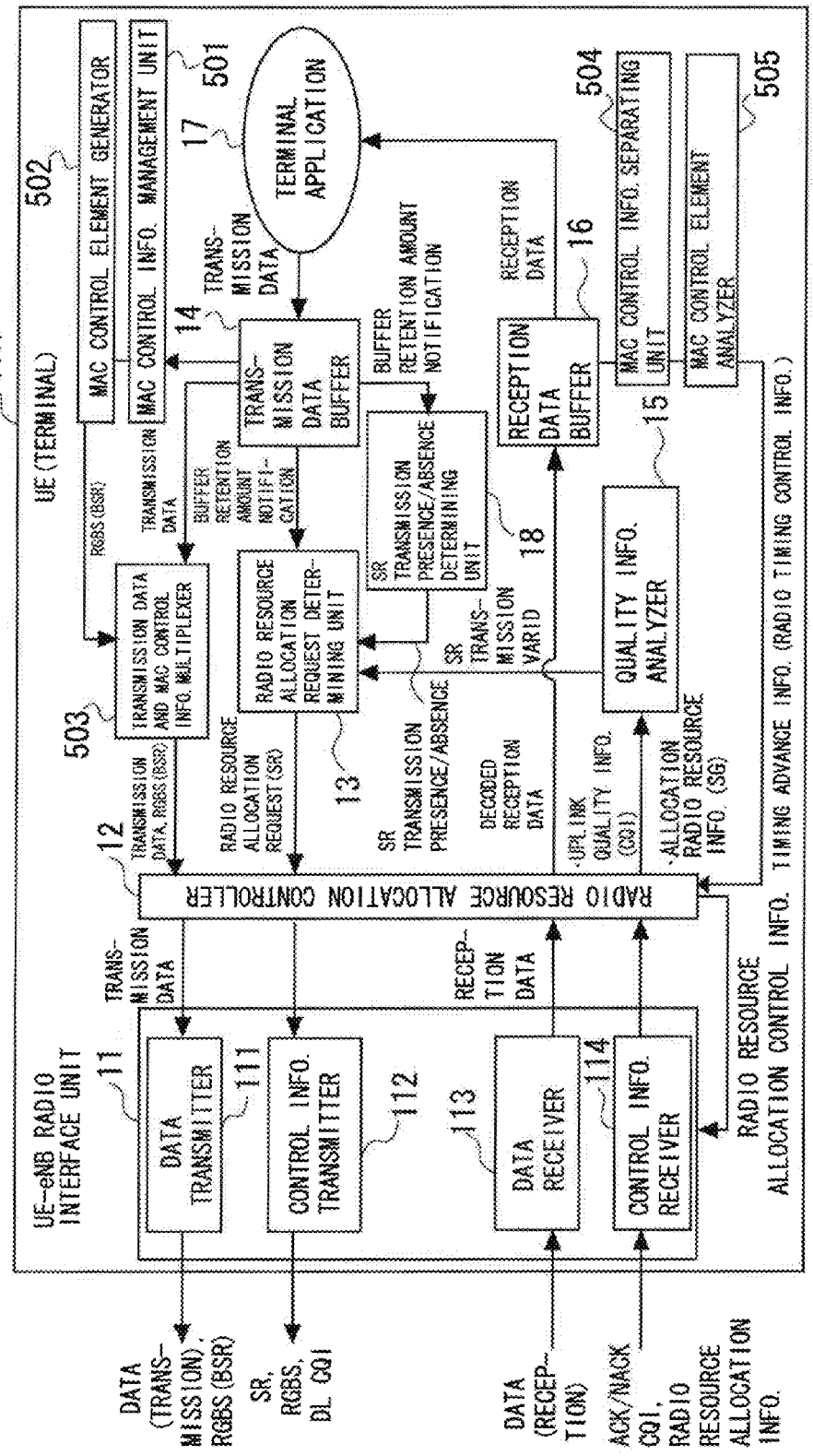
FIG. 22A is a diagram illustrating an example of the configuration of a terminal device (UE) that is employed in the fifth embodiment.

FIG. 22A is a diagram illustrating an example of the UE configuration that is employed in the fifth embodiment, and FIG. 22B is a diagram illustrating an example of the base station configuration that is employed in the fifth embodiment. Compared to the UE 10 illustrated in FIG. 3A, a UE 10A in FIG. 22A includes the following additional components.

A MAC control information management unit 501 is provided to determine the buffer retention amount (RGBS) in the transmission data buffer 14. Further, a MAC CE generating unit 502 is provided to generate a MAC control element (hereinafter abbreviated as "MAC CE") that contains the buffer retention amount (RGBS (BSR)) obtained in the MAC control information management unit 501. A transmission data-MAC control information multiplexer 503 is further provided to multiplex transmission data from the transmission data buffer 14 and the MAC CE containing the RGBS (BSR) in a MAC PDU. A MAC frame that contains the MAC PDU generated in the multiplexer 503 is sent to the radio resource allocation controller 12. The radio resource allocation controller 12 uses a resource allocated by the base station to transmit data that contains the MAC frame from the data transmitter 111 to the base station (eNode B) (uplink transmission). A PUSCH is used for this MAC frame transfer.

The UE 10A also includes a MAC control information separating unit 504, which obtains a MAC PDU transmitted from the base station and stored in the reception data buffer 16, and extracts a MAC CE (MAC control information) from the MAC PDU. The UE 10A includes a MAC control element analyzer 505 as well to analyze the contents of the MAC CE obtained by the separating unit 505. The analyzer 505 takes control information timing advance (TA) out of the MAC CE, and notifies the TA to the radio resource allocation controller 12.

The UE 10A thus uses a MAC CE to receive control information TA from the base station. The TA is a command with which the UE adjusts the timing of receiving data from the base station. Based on reception data from the UE, the base station compares the reception timing of the reception data and reference timing (held in the base station in advance) to determine a differential between the two, and issues TA as a command that instructs the UE to adjust the data transmission timing. In the UE 10A, the separating unit 504 and the analyzer 505 obtain the TA from the base station, and the TA is notified to the radio resource allocation controller 12. The radio resource allocation controller 12 adjusts the timing of transmission to the base station based on the TA. The base station may thus receive transmission data (including a MAC CE) from the UE at appropriate reception timing, and may use the buffer retention amount contained in the MAC CE for the resource allocation processing which has been described in the first to fourth embodiments.

Other components of the UE 10A except the components described above have substantially the same configurations and functions as those of their corresponding components (denoted by the same reference numerals and symbols) of the UE 10 illustrated in FIG. 3A.

As illustrated in FIG. 22B, a base station (eNode B) 20A in the fifth embodiment has the following components in addition to the configurations of the base station 20 illustrated in FIG. 3B. That is, a MAC control information separating unit 511 is provided to obtain a MAC PDU transmitted from the UE and stored in the reception data buffer 23, and extract a MAC CE (MAC control information). The base station 20A also includes a MAC control element analyzer 512 to obtain the MAC CE from the separating unit 511 and analyze the MAC CE. The analyzer 512 extracts a BSR (buffer retention amount (RGBS)) from the MAC CE, and notifies the RGBS value to the radio resource allocation request analyzer 25 and the UE radio resource controller (scheduler) 27.

The base station 20A also includes a reception timing analyzer 513, which receives data (data for generating timing advance) indicating the reception timing of data that is received by the reception data buffer 23, and analyzes a deviation of the reception timing by comparing with the reference timing held in advance. The analyzer 513 compares actual reception timing against the reference timing to find out a deviation of the former from the latter and, based on the findings, notifies information for adjusting the reception timing at the base station 20A to a MAC control element generating unit 514. The generating unit 514 issues control information TA that reflects the reception timing adjustment information, generates a MAC CE containing this TA, and notifies the TA to a transmission data-MAC control information multiplexer 515.

The multiplexer 515 generates a MAC frame that contains a MAC PDU where transmission data and the MAC control information (MAC CE) is multiplexed, and sends the MAC frame to the radio resource allocation controller 22. The MAC frame is sent out to the UE 20A (downlink transmission) from the data transmitter 213 with the use of a resource allocated to the UE by the radio resource allocation controller 22.

As described above, the base station 20A uses a BSR, namely, the buffer retention amount (RGBS) notified via a MAC CE to perform the resource allocation control described in the first to fourth embodiments. On the other hand, in the base station 20A, control information TA for adjusting the reception timing of data from the UE 10A is issued, and a MAC PDU containing the TA is notified to the UE 10A over the downlink user channel.

When the UE is on the move, actual reception time in some cases deviates from the reception timing from the UE that is expected on the base station side. The reception timing adjusting function using the TA is provided in order to adjust this deviation. With this adjusting function, the base station 20A side takes a lead and issues a TA command to the UE 10A, and hence the timing of data transmission from the UE 10A is adjusted in order. The base station 20A may thus receive at optimum timing data transmitted from the UE 10A.

Other components of the base station 20A except the components described above have substantially the same configurations and functions as those of their corresponding components (denoted by the same reference numerals and symbols) of the base station 20 illustrated in FIG. 3B.

Figure 23:
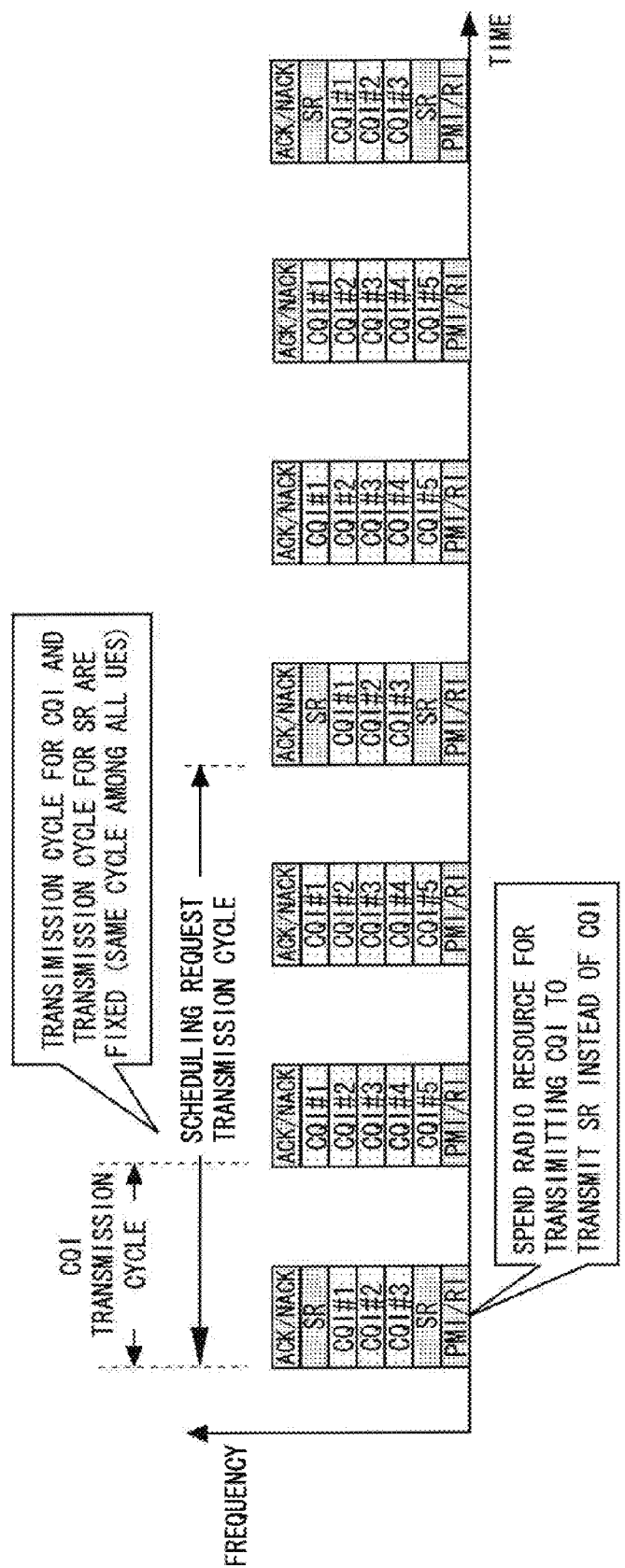
FIG. 23 is a diagram illustrating an example of a PUCCH1 in the fifth embodiment.

FIG. 23 is a diagram of multiplexed data of a PUCCH1 in the fifth embodiment. As illustrated in FIG. 23, the part that radio resources are cyclically allocated for CQI transmission and for SR transmission is the same. The RGBS, however, is not transferred over a PUCCH1. Further, radio resources are cyclically allocated for the transmission of HARQ ACK/NACK information about data transfer from the base station to the terminal (UE), and the transmission of a precoding matrix indicator (PMI) and a rank indicator (RI) which are notified from the UE when MIMO is applied.

The ACK/NACK information is information returned to the base station in order to notify whether or not data reception in the UE is normal during data transfer from the base station to the UE. When the UE receives data normally, the UE returns an ACK message. When the UE fails to receive data normally, on the other hand, the UE returns an NACK message to the base station, and requests for the retransmission of the data. When requested to retransmit data, the base station sends the same data to the UE again. Data is not retransmitted when an ACK message is received. This mechanism is called hybrid ARQ (HARQ).

The PMI/RI is information used to implement applying MIMO to communication between the UE and the base station. MIMO is a method of transmitting/receiving a plurality of pieces of data simultaneously by utilizing a plurality of antennas. In the case of 2×2 MIMO, for example, two antennas on the transmission side and two antennas on the reception side are used to transmit/receive two pieces of data concurrently. In this way, the data transfer rate is doubled.

The PMI is matrix information in using MIMO (information used to implement deciphering multiplexed data). The RI is a rank indicator for specifying the count of antennas used and the degree of multiplexing of data by ranks 1 to 4.

The PMI/RI is dynamically switched between the UE and the base station, and hence the MIMO is switched to a mode fit for the quality indicated by the switched PMI/RI. As a result, a switch is made between fast rate communication and slow rate communication. For example, the MIMO mode is switched such that fast rate communication is used when the communication quality is high, whereas slow rate communication is used when the communication quality is low.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of controlling allocation of a radio resource for a radio resource allocation request in a base station which allocates, to a terminal, in response to the radio resource allocation request received from the terminal, a radio resource for transmitting retention data in a transmission buffer of the terminal to the base station, and which transmits to the terminal a radio resource allocation notification indicating a result of the allocation, the method comprising:

receiving an amount of retention data in the transmission buffer from the terminal;

cyclically allocating the terminal a radio resource for the radio resource allocation request when the amount of retention data is zero; and determining a transmission cycle that is suited to the amount of retention data as a transmission cycle of the notification of radio resource allocation for transmitting the retention data in the transmission buffer when the amount of retention data is not zero, and stopping the allocation of the radio resource for the radio resource allocation request and receiving a CQI(Channel Quality Indicator) from the terminal in a transmission cycle in which the radio resource for the radio resource allocation request was allocated during cyclic transmission of the radio resource allocation notification.

2. The method of controlling allocation of a radio resource for a radio resource allocation request according to claim 1, wherein the base station performs:

receiving retention amounts of a plurality of transmission buffers which are provided in the terminal in association with a plurality of priority classes;

continuing the cyclic transmission of the radio resource allocation notification relating to retention data in one of the transmission buffers of one priority class of the plurality of priority classes, while allocating the terminal a radio resource for a radio resource allocation request for transmission of retention data in another one of the transmission buffers of a priority class higher than the one priority class in a case where data retention in the higher priority class transmission buffer is detected during conducting the cyclic transmission of the radio resource allocation notification relating to the retention data in the one priority class transmission buffer;

allocating a radio resource for the transmission of the retention data in the higher priority class transmission buffer, and determining a radio resource allocation notification transmission cycle upon reception of the radio resource allocation request, from the terminal, for the transmission of the retention data in the higher priority class transmission buffer;

starting cyclic transmission of a radio resource allocation notification for the higher priority class transmission buffer and stopping the cyclic transmission of the radio resource allocation notification for the one priority class transmission buffer; and stopping allocating a radio resource for the transmission of the radio resource allocation request during the cyclic transmission of the radio resource allocation notification for the higher priority class transmission buffer.

3. The method of controlling allocation of a radio resource for a radio resource allocation request according to claim 2, wherein the base station performs:

allocating a radio resource for the transmission of the radio resource allocation request for transmission of retention data retained in the one priority class transmission buffer when the one priority class transmission buffer is holding the retention data at a time of completion of the transmission of the retention data in the higher priority class transmission buffer;

allocating a radio resource for transmission of the retention data in the one priority class transmission buffer in a case where the radio resource allocation request for transmission of the retention data in the one priority class transmission buffer is received from the terminal; and starting cyclic transmission of a radio resource allocation for the retention data of the one priority class transmission buffer and stopping allocation of the radio resource for the transmission of the radio resource allocation request during the cyclic transmission of the radio resource allocation notification.

4. The method of controlling allocation of a radio resource for a radio resource allocation request according to claim 1, wherein the base station performs:

receiving retention amounts of a plurality of transmission buffers which are provided in the terminal in association with a plurality of priority classes;

continuing the cyclic transmission of the radio resource allocation notification in a case where retention data in one of the transmission buffers of one priority class of the plurality of priority classes in a case where data retention in another one of the transmission buffer of a priority class lower than the one priority class is detected during the cyclic transmission of the radio resource allocation notification relating to retention data in the one priority class transmission buffer;

allocating a radio resource for a radio resource allocation request for the retention data in the lower priority class transmission buffer upon completion of the transmission of the retention data in the one priority class transmission buffer;

allocating a radio resource for the transmission of the retention data, and determining a radio resource allocation notification transmission cycle upon reception of the radio resource allocation request from the terminal for transmission of the retention data; and starting cyclic transmission of a radio resource allocation notification for the retention data and, during the cyclic transmission of the radio resource allocation notification, stopping allocating a radio resource for a radio resource allocation request.

5. A base station to control allocation of a radio resource for a radio resource allocation request, the base station allocating, to a terminal, in response to the radio resource allocation request received from the terminal, a radio resource for transmitting retention data in a transmission buffer of the terminal to the base station, and transmitting to the terminal a radio resource allocation notification indicating a result of the allocation, the base station comprising:

a receiver to receive an amount of retention data in the transmission buffer from the terminal;

a unit to cyclically allocate the terminal a radio resource for the radio resource allocation request when the amount of retention data is zero; and a unit to determine a transmission cycle that is suited to the amount of retention data as a transmission cycle of the notification of radio resource allocation for transmitting the retention data in the transmission buffer when the amount of retention data is not zero, and to stop the allocation of the radio resource for the radio resource allocation request and to receive a CQI(Channel Quality Indicator) from the terminal in a transmission cycle in which the radio resource for the radio resource allocation request was allocated during cyclic transmission of the radio resource allocation notification.

* * * * *